(12) United States Patent
Okumura et al.

(10) Patent No.: US 6,280,848 B1
(45) Date of Patent: Aug. 28, 2001

(54) ANTIREFLECTION COATING

(75) Inventors: Masaru Okumura, Osaka; Hakuzo Tani, Takatsuki, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/413,736

(22) Filed: Oct. 6, 1999

(30) Foreign Application Priority Data

Oct. 6, 1998 (JP) ................................... 10-284024
Oct. 6, 1998 (JP) ................................... 10-284222

(51) Int. Cl.$^7$ ................................................. B32B 17/06
(52) U.S. Cl. ................... 428/426; 359/359; 359/360; 359/580; 359/588; 359/589; 428/212; 428/216; 428/336; 428/343; 428/344; 428/426; 428/432; 428/697; 428/701; 428/702
(58) Field of Search ..................... 359/359, 360, 359/580, 588, 589; 428/212, 216, 336, 343, 344, 426, 432, 697, 701, 702

(56) References Cited

U.S. PATENT DOCUMENTS 5,885,712 * 3/1999 Otani et al. ........................ 428/426

5,963,365 * 10/1999 Shirai ................................... 359/359

FOREIGN PATENT DOCUMENTS 62-42101   2/1987 (JP).
5-2101     1/1993 (JP).
10-39105   2/1998 (JP).

* cited by examiner

Primary Examiner—Deborah Jones
Assistant Examiner—Lymarie Miranda
(74) Attorney, Agent, or Firm—Sidley Austin Brown & Wood

(57) ABSTRACT

Four and five-layer antireflection coatings are disclosed suitable for use on optical parts such as lenses and prisms in which layers of thin films are formed on the surfaces of the optical parts by a process such as vacuum evaporation. By selecting the materials for the layers based on the refractive index of the materials, as well as based on the refractive index of the substrate, reflectance of the s-polarized component of incident light can be reduced over a large range of incident angle up to a range of approximately 45 degrees.

14 Claims, 27 Drawing Sheets

$(\lambda 0) = 550$ nm

| | | n | d (nm) | nd (nm) |
|---|---|---|---|---|
| | Air | | | |
| 4 | MgF$_2$ | 1.385 | 116 | 0.292 $\lambda 0$ |
| 3 | TiO$_2$ | 2.450 | 126 | 0.562 $\lambda 0$ |
| 2 | MgO | 1.750 | 105 | 0.334 $\lambda 0$ |
| 1 | MgF$_2$ | 1.385 | 247 | 0.622 $\lambda 0$ |
| | Substrate | 1.52 | | |

FIG. 1

($\lambda 0$) = 550 nm

| | | | n | d (nm) | nd (nm) |
|---|---|---|---|---|---|
| | Air | | | | |
| 4 | $MgF_2$ | | 1.385 | 116 | 0.292 $\lambda 0$ |
| 3 | $TiO_2$ | | 2.450 | 126 | 0.562 $\lambda 0$ |
| 2 | MgO | | 1.750 | 105 | 0.334 $\lambda 0$ |
| 1 | $MgF_2$ | | 1.385 | 247 | 0.622 $\lambda 0$ |
| | Substrate | | 1.52 | | |

FIG. 3

($\lambda 0$) = 550 nm

| | | | n | d (nm) | nd (nm) |
|---|---|---|---|---|---|
| | Air | | | | |
| 4 | $MgF_2$ | | 1.385 | 111 | 0.281 $\lambda 0$ |
| 3 | $TiO_2$ | | 2.450 | 227 | 1.012 $\lambda 0$ |
| 2 | $Al_2O_3$ | | 1.620 | 91 | 0.268 $\lambda 0$ |
| 1 | $MgF_2$ | | 1.385 | 111 | 0.281 $\lambda 0$ |
| | Substrate | | 1.52 | | |

FIG. 5

($\lambda 0$) = 550 nm

| | | | n | d (nm) | nd (nm) |
|---|---|---|---|---|---|
| | Air | | | | |
| 4 | $SiO_2$ | | 1.470 | 121 | 0.325 $\lambda 0$ |
| 3 | $TiO_2$ | | 2.450 | 26 | 0.117 $\lambda 0$ |
| 2 | $Al_2O_3$ | | 1.620 | 111 | 0.326 $\lambda 0$ |
| 1 | $MgF_2$ | | 1.385 | 116 | 0.291 $\lambda 0$ |
| | Substrate | | 1.52 | | |

FIG. 7

($\lambda$ 0) = 550 nm

| | Air | n | d (nm) | nd (nm) |
|---|---|---|---|---|
| 4 | SiO$_2$ | 1.470 | 113 | 0.302 $\lambda$ 0 |
| 3 | TiO$_2$ | 2.450 | 32 | 0.142 $\lambda$ 0 |
| 2 | MgO | 1.750 | 91 | 0.290 $\lambda$ 0 |
| 1 | MgF$_2$ | 1.385 | 155 | 0.389 $\lambda$ 0 |
| | Substrate | 1.52 | | |

FIG. 9

($\lambda$ 0) = 550 nm

| | Air | n | d (nm) | nd (nm) |
|---|---|---|---|---|
| 4 | MgF$_2$ | 1.385 | 135 | 0.340 $\lambda$ 0 |
| 3 | TiO$_2$ | 2.450 | 16 | 0.072 $\lambda$ 0 |
| 2 | Al$_2$O$_3$ | 1.620 | 124 | 0.365 $\lambda$ 0 |
| 1 | SiO$_2$ | 1.470 | 106 | 0.284 $\lambda$ 0 |
| | Substrate | 1.52 | | |

FIG. 11

($\lambda$ 0) = 550 nm

| | Air | n | d (nm) | nd (nm) |
|---|---|---|---|---|
| 4 | SiO$_2$ | 1.470 | 118 | 0.316 $\lambda$ 0 |
| 3 | TiO$_2$ | 2.450 | 27 | 0.120 $\lambda$ 0 |
| 2 | MgO | 1.750 | 104 | 0.330 $\lambda$ 0 |
| 1 | SiO$_2$ | 1.470 | 107 | 0.285 $\lambda$ 0 |
| | Substrate | 1.52 | | |

FIG. 13

($\lambda 0$) = 550 nm

| | | n | d (nm) | nd (nm) |
|---|---|---|---|---|
| | Air | | | |
| 4 | MgF$_2$ | 1.385 | 111 | 0.280 $\lambda 0$ |
| 3 | TiO$_2$ | 2.450 | 114 | 0.508 $\lambda 0$ |
| 2 | MgO | 1.750 | 121 | 0.385 $\lambda 0$ |
| 1 | MgF$_2$ | 1.385 | 17 | 0.042 $\lambda 0$ |
| | Substrate | 1.52 | | |

FIG. 15

($\lambda 0$) = 550 nm

| | | n | d (nm) | nd (nm) |
|---|---|---|---|---|
| | Air | | | |
| 5 | MgF$_2$ | 1.385 | 108 | 0.273 $\lambda 0$ |
| 4 | TiO$_2$ | 2.450 | 90 | 0.399 $\lambda 0$ |
| 3 | MgF$_2$ | 1.385 | 18 | 0.046 $\lambda 0$ |
| 2 | TiO$_2$ | 2.450 | 18 | 0.080 $\lambda 0$ |
| 1 | MgF$_2$ | 1.385 | 224 | 0.565 $\lambda 0$ |
| | Substrate | 1.52 | | |

FIG. 17

($\lambda 0$) = 550 nm

| | | n | d (nm) | nd (nm) |
|---|---|---|---|---|
| | Air | | | |
| 5 | MgF$_2$ | 1.385 | 112 | 0.282 $\lambda 0$ |
| 4 | TiO$_2$ | 2.450 | 235 | 1.046 $\lambda 0$ |
| 3 | MgF$_2$ | 1.385 | 31 | 0.078 $\lambda 0$ |
| 2 | ZrTiO$_4$ | 2.100 | 27 | 0.104 $\lambda 0$ |
| 1 | SiO$_2$ | 1.470 | 113 | 0.302 $\lambda 0$ |
| | Substrate | 1.52 | | |

FIG. 19

($\lambda 0$) = 550 nm

| | Air | | n | d (nm) | nd (nm) |
|---|---|---|---|---|---|
| 5 | MgF$_2$ | | 1.385 | 109 | 0.274 $\lambda$ 0 |
| 4 | TiO$_2$ | | 2.450 | 85 | 0.380 $\lambda$ 0 |
| 3 | MgF$_2$ | | 1.385 | 9 | 0.023 $\lambda$ 0 |
| 2 | ZrTiO$_4$ | | 2.100 | 36 | 0.136 $\lambda$ 0 |
| 1 | MgF$_2$ | | 1.385 | 220 | 0.553 $\lambda$ 0 |
| | Substrate | | 1.52 | | |

FIG. 21 a($\lambda 0$) = 550 nm

| | Air | | n | d (nm) | nd (nm) |
|---|---|---|---|---|---|
| 5 | MgF$_2$ | | 1.385 | 120 | 0.303 $\lambda$ 0 |
| 4 | TiO$_2$ | | 2.450 | 44 | 0.194 $\lambda$ 0 |
| 3 | Al$_2$O$_3$ | | 1.620 | 40 | 0.116 $\lambda$ 0 |
| 2 | TiO$_2$ | | 2.450 | 24 | 0.107 $\lambda$ 0 |
| 1 | MgF$_2$ | | 1.385 | 237 | 0.598 $\lambda$ 0 |
| | Substrate | | 1.52 | | |

FIG. 23

($\lambda 0$) = 550 nm

| | Air | | n | d (nm) | nd (nm) |
|---|---|---|---|---|---|
| 5 | MgF$_2$ | | 1.385 | 108 | 0.272 $\lambda$ 0 |
| 4 | TiO$_2$ | | 2.450 | 106 | 0.474 $\lambda$ 0 |
| 3 | Al$_2$O$_3$ | | 1.620 | 28 | 0.083 $\lambda$ 0 |
| 2 | TiO$_2$ | | 2.450 | 12 | 0.052 $\lambda$ 0 |
| 1 | SiO$_2$ | | 1.470 | 194 | 0.518 $\lambda$ 0 |
| | Substrate | | 1.52 | | |

FIG. 25

($\lambda$ 0) = 550 nm

|   | Air | n | d (nm) | nd (nm) |
|---|---|---|---|---|
| 5 | MgF$_2$ | 1.385 | 108 | 0.272 $\lambda$ 0 |
| 4 | TiO$_2$ | 2.450 | 106 | 0.471 $\lambda$ 0 |
| 3 | SiO$_2$ | 1.470 | 31 | 0.082 $\lambda$ 0 |
| 2 | TiO$_2$ | 2.450 | 11 | 0.047 $\lambda$ 0 |
| 1 | SiO$_2$ | 1.470 | 193 | 0.516 $\lambda$ 0 |
|   | Substrate | 1.52 |   |   |

FIG. 27

($\lambda$ 0) = 550 nm

|   | Air | n | d (nm) | nd (nm) |
|---|---|---|---|---|
| 5 | SiO$_2$ | 1.470 | 105 | 0.280 $\lambda$ 0 |
| 4 | TiO$_2$ | 2.450 | 64 | 0.285 $\lambda$ 0 |
| 3 | SiO$_2$ | 1.470 | 26 | 0.069 $\lambda$ 0 |
| 2 | TiO$_2$ | 2.450 | 123 | 0.103 $\lambda$ 0 |
| 1 | SiO$_2$ | 1.470 | 424 | 0.134 $\lambda$ 0 |
|   | Substrate | 1.52 |   |   |

FIG. 29

($\lambda$ 0) = 550 nm

|   | Air | n | d (nm) | nd (nm) |
|---|---|---|---|---|
| 5 | MgF$_2$ | 1.385 | 120 | 0.301 $\lambda$ 0 |
| 4 | TiO$_2$ | 2.450 | 42 | 0.188 $\lambda$ 0 |
| 3 | MgO | 1.750 | 45 | 0.144 $\lambda$ 0 |
| 2 | TiO$_2$ | 2.450 | 21 | 0.095 $\lambda$ 0 |
| 1 | MgF$_2$ | 1.385 | 236 | 0.595 $\lambda$ 0 |
|   | Substrate | 1.52 |   |   |

FIG. 31

($\lambda$ 0) = 550 nm

| | Air | | n | d (nm) | nd (nm) |
|---|---|---|---|---|---|
| 5 | MgF$_2$ | | 1.385 | 114 | 0.286 $\lambda$ 0 |
| 4 | TiO$_2$ | | 2.450 | 127 | 0.566 $\lambda$ 0 |
| 3 | MgF$_2$ | | 1.385 | 36 | 0.091 $\lambda$ 0 |
| 2 | TiO$_2$ | | 2.450 | 22 | 0.097 $\lambda$ 0 |
| 1 | MgF$_2$ | | 1.385 | 22 | 0.056 $\lambda$ 0 |
| | Substrate | | 1.52 | | |

FIG. 33

($\lambda$ 0) = 550 nm

| | Air | | n | d (nm) | nd (nm) |
|---|---|---|---|---|---|
| 4 | MgF$_2$ | | 1.385 | 107 | 0.269 $\lambda$ 0 |
| 3 | Ta$_2$O$_5$ | | 2.100 | 141 | 0.536 $\lambda$ 0 |
| 2 | Al$_2$O$_3$ | | 1.620 | 122 | 0.360 $\lambda$ 0 |
| 1 | SiO$_2$ | | 1.470 | 42 | 0.111 $\lambda$ 0 |
| | Substrate | | 1.52 | | |

PRIOR ART

FIG. 34

($\lambda$ 0) = 550 nm

| | Air | | n | d (nm) | nd (nm) |
|---|---|---|---|---|---|
| 4 | MgF$_2$ | | 1.385 | 99 | 0.25 $\lambda$ 0 |
| 3 | Ta$_2$O$_5$ | | 2.100 | 131 | 0.50 $\lambda$ 0 |
| 2 | Al$_2$O$_3$ | | 1.620 | 85 | 0.25 $\lambda$ 0 |
| 1 | SiO$_2$ | | 1.470 | 94 | 0.25 $\lambda$ 0 |
| | Substrate | | 1.52 | | |

PRIOR ART

FIG. 35

($\lambda$ 0) = 550 nm

| | Air | | n | d (nm) | nd (nm) |
|---|---|---|---|---|---|
| 5 | MgF$_2$ | | 1.385 | 99 | 0.292 $\lambda$ 0 |
| 4 | ZrTiO$_4$ | | 2.100 | 139 | 0.530 $\lambda$ 0 |
| 3 | SiO$_2$ | | 1.470 | 54 | 0.145 $\lambda$ 0 |
| 2 | ZrTiO$_4$ | | 2.100 | 16 | 0.060 $\lambda$ 0 |
| 1 | MgF$_2$ | | 1.385 | 64 | 0.160 $\lambda$ 0 |
| | Substrate | | 1.52 | | |

PRIOR ART

FIG. 36

($\lambda$ 0) = 550 nm

| | Air | | n | d (nm) | nd (nm) |
|---|---|---|---|---|---|
| 5 | MgF$_2$ | | 1.385 | 100 | 0.252 $\lambda$ 0 |
| 4 | ZrTiO$_4$ | | 2.100 | 100 | 0.382 $\lambda$ 0 |
| 3 | Al$_2$O$_3$ | | 1.620 | 17 | 0.049 $\lambda$ 0 |
| 2 | ZrTiO$_4$ | | 2.100 | 10 | 0.038 $\lambda$ 0 |
| 1 | Al$_2$O$_3$ | | 1.620 | 67 | 0.196 $\lambda$ 0 |
| | Substrate | | 1.52 | | |

PRIOR ART

ANTIREFLECTION COATING

RELATED APPLICATIONS

This Application is based on Application numbers 10-284024 and 10-284222 filed in Japan, the contents of which are hereby incorporated by reference.

FIELD OF THE INVENTION

The present invention relates to an antireflection coating applied to the surfaces of optical parts, and more particularly, to an antireflection coating comprising four or five layers of thin films.

BACKGROUND OF THE INVENTION

A method is known to reduce the surface reflection on optical parts such as lenses and prisms in which some layers of thin films are formed on the surfaces of the optical parts by vacuum evaporation or the like.

FIG. 33 shows an example of a conventional four-layer antireflection coating (first prior art). In FIG. 33, the conventional antireflection coating comprises from the substrate side: a first layer of $SiO_2$ (silicon dioxide, refractive index n1=1.47, thickness d1=42 nm); a second layer of $Al_2O_3$ (alumina, refractive index n2=1.62, thickness d2=122 nm); a third layer of $Ta_2O_5$ (tantalum oxide, refractive index n3=2.10, thickness d3=141 nm); and a fourth layer of $MgF_2$ (magnesium fluoride, refractive index n4=1.385, thickness d4=107 nm). The design dominant wavelength $\lambda_0$ is 550 nm, and nd represents the optical thickness (in nm). At this time, a low reflectance is obtained.

As another example of the conventional four-layer antireflection coating, FIG. 34 shows an antireflection coating described in Japanese Laid-Open Patent Application number 62-42101 (second prior art). In FIG. 34, the antireflection coating of this prior art comprises from the substrate side: a first layer of $SiO_2$ (thickness d1=94 nm); a second layer of $Al_2O_3$ (thickness d2=85 nm); a third layer of $Ta_2O_5$ (thickness d3=131 nm); and a fourth layer of $MgF_2$ (thickness d4=99 nm) At this time, a low reflectance is obtained in a wide band.

As an example of a conventional five-layer antireflection coating, FIG. 35 shows an antireflection coating described in Japanese Laid-Open Patent Application No. 5-2101 (third prior art). In FIG. 35, the antireflection coating of this prior art comprises from the substrate side: a first layer of $MgF_2$ (magnesium fluoride, refractive index n1=1.385, thickness d1=64 nm); a second layer of $ZrTiO_4$ (titanium zirconium oxide, refractive index n2=2.1, thickness d2=16 nm); a third layer of $SiO_2$ (silicon dioxide, refractive index n3=1.47, thickness d3=54 nm); a fourth layer of $ZrTiO_4$ (refractive index n4=2.1, thickness d4=139 nm); and a fifth layer of $MgF_2$ (refractive index n5=1.385, thickness d5=99 nm). The design dominant wavelength $\lambda_0$ is 550 nm, and nd represents the optical thickness (in nm). At this time, a low reflectance is obtained.

As another example of the conventional five-layer antireflection coating, FIG. 36 shows an antireflection coating disclosed in Japanese Laid-Open Patent Application number 10-39105 (fourth prior art). In FIG. 36, the antireflection coating of this prior art comprises from the substrate side: a first layer of $Al_2O_3$ (alumina, refractive index n1=1.62, thickness d1=67 nm); a second layer of $ZrTiO_4$ (refractive index n2=2.1, thickness d2=10 nm); a third layer of $Al_2O_3$ (refractive index n3=1.62, thickness d3=17 nm); a fourth layer of $ZrTiO_4$ (refractive index n4=2.1, thickness d4=100 nm); a fifth layer of $MgF_2$ (refractive index n5=1.385, thickness d5=100 nm). At this time, a low reflectance is obtained in the entire visible wavelength range.

Generally, when the incident angle of the light incident on an optical part is large, the polarized components are separated, and the s-polarized component of the light is higher in reflectance than the p-polarized component of the light. For this reason, the s-polarized component of the light is mainly used to thereby decrease the reduction in the quantity of projected light, particularly, in liquid crystal projectors and the like having illumination optical systems using polarized light.

However, it is necessary that reflectance be low in the antireflection coating. According to the antireflection coatings of the prior arts, although reflectance is low for both the p- and the s-polarized components in a range where the incident angle is small, the reflectance Rs of the light of the s-polarized component is high in the neighborhood of an incident angle of 45 degrees because of the separation of the polarized components. FIGS. 37 to 40 show reflectance characteristics of the antireflection coatings of the structures of FIGS. 33 to 36 at an incident angle of 45 degrees. In FIGS. 33 to 36, the vertical axes represent the reflectance and the horizontal axes represent the wavelength.

According to FIGS. 33 to 36, in the neighborhood of the design wavelength $\lambda_0$ (550 nm), although the reflectance Rp of the light of the p-polarized component is low, the reflectance Rs of the light of the s-polarized component is high. Therefore, when the light of the s-polarized component is made incident at an incident angle of 45 degrees on a filter or the like having any one of the antireflection coatings applied to the reverse surface thereof, a double image is formed by the light reflected at the surface of the filter and the light transmitted by the filter and reflected at the antireflection coating.

SUMMARY OF THE INVENTION

An object of the present invention is to provide an improved antireflection coating.

Another object of the present invention is to provide an antireflection coating capable of reducing the reflectance of the light of the s-polarized component.

The objects of the present invention are achieved by an antireflection coating having the following structure:

An antireflection coating in which a reflectance of light of an s-polarized component is lower than a reflectance of light of a p-polarized component when an incident angle of light of a predetermined wavelength range including a design dominant wavelength is 45 degrees.

Further, the objects of the present invention are achieved by an antireflection coating having the following structure:

In an antireflection coating of a four-layer structure comprising thin films of a first layer, a second layer, a third layer and a fourth layer from a substrate side, when refractive indices and thicknesses of the first, the second, the third and the fourth layers are n1, n2, n3 and n4 and d1, d2, d3 and d4 and a design dominant wavelength is $\lambda_0$, the following relationships are satisfied:

$n3 > n2 > n1 \geq n4$ $0 < (n1*d1) \leq 0.75*\lambda_0$ $0.20\lambda_0 \leq (n2*d2) \leq 0.43*\lambda_0$ $0.07\lambda_0 \leq (n3*d3) \leq 1.10*\lambda_0$ $0.28\lambda_0 \leq (n4*d4) \leq 0.35*\lambda_0$ Further, the objects of the present invention are achieved by an antireflection coating having the following structure:

In an antireflection coating of a five-layer structure comprising thin films of a first layer, a second layer, a third layer, a fourth layer and a fifth layer from a substrate side, when refractive indices and thicknesses of the first, the second, the third, the fourth and the fifth layers are n1, n2, n3, n4 and n5 and d1, d2, d3, d4 and d5 and a design dominant wavelength is $\lambda_0$, n2 or n3 is not more than 1.56, and the following relationships:

n4≧n2>n1≧n5 n2>n3

$0 < (n1*d1) \leq 0.06*\lambda_0$ $0.03*\lambda_0 \leq (n2*d2) \leq 0.15*\lambda_0$ $0.02*\lambda_0 \leq (n3*d3) \leq 0.19*\lambda_0$ $0.09*\lambda_0 \leq (n4*d4) \leq 1.30*\lambda_0$ $0.24*\lambda_0 \leq (n5*d5) \leq 0.36*\lambda_0$ or the following relationships:

n4≧n2>n1≧n5 n2>n3

$0.20 \leq (n1*d1) \leq 1.25*\lambda_0$ $0.03*\lambda_0 \leq (n2*d2) \leq 0.15*\lambda_0$ $0.02*\lambda_0 \leq (n3*d3) \leq 0.19*\lambda_0$ $0.09*\lambda_0 \leq (n4*d4) \leq 1.30*\lambda_0$ $0.24*\lambda_0 \leq (n5*d5) \leq 0.36*\lambda_0$ are satisfied.

BRIEF DESCRIPTION OF THE DRAWINGS

This and other objects and features of this invention will become clear from the following description, taken in conjunction with the preferred embodiments with reference to the accompanied drawings in which:

FIG. 1 shows the structure of an antireflection coating according to a first embodiment;

FIG. 3 shows the structure of an antireflection coating according to a second embodiment;

FIG. 5 shows the structure of an antireflection coating according to a third embodiment;

FIG. 7 shows the structure of an antireflection coating according to a fourth embodiment;

FIG. 9 shows the structure of an antireflection coating according to a fifth embodiment;

FIG. 11 shows the structure of an antireflection coating according to a sixth embodiment;

FIG. 13 shows the structure of an antireflection coating according to a seventh embodiment;

FIG. 15 shows the structure of an antireflection coating according to an eighth embodiment;

FIG. 17 shows the structure of an antireflection coating according to a ninth embodiment;

FIG. 19 shows the structure of an antireflection coating according to a tenth embodiment;

FIG. 21 shows the structure of an antireflection coating according to an eleventh embodiment;

FIG. 23 shows the structure of an antireflection coating according to a twelfth embodiment;

FIG. 25 shows the structure of an antireflection coating according to a thirteenth embodiment;

FIG. 27 shows the structure of an antireflection coating according to a fourteenth embodiment;

FIG. 29 shows the structure of an antireflection coating according to a fifteenth embodiment;

FIG. 31 shows the structure of an antireflection coating according to a sixteenth embodiment;

FIG. 33 shows the structure of the antireflection coating according to the first prior art;

FIG. 34 shows the structure of the antireflection coating according to the second prior art;

FIG. 35 shows the structure of the antireflection coating according to the third prior art;

FIG. 36 shows the structure of the antireflection coating according to the fourth prior art;

DETAILED DESCRIPTION OF THE PREFERRED EMBODIMENTS

Hereinafter, preferred embodiments of the present invention will be described in further detail with reference to the drawings.

Embodiments of Four-layer Structure:

Embodiments of the four-layer structure will be described first with reference to the drawings. FIG. 1 shows the structure of an antireflection coating according to a first embodiment. The design dominant wavelength $\lambda_0$ is 550 nm. On a substrate (having a refractive index ns=1.52) comprising optical parts such as lenses and prisms, the following thin films are formed from the substrate side: a first layer of $MgF_2$ (refractive index n1=1.385, thickness d1=247 nm); a second layer of MgO (magnesium oxide, refractive index n2=1.75, thickness d2=105 nm); a third layer of TiO2 (titanium oxide, refractive index n3=2.45, thickness d3=126 nm); and a fourth layer of $MgF_2$ (refractive index n4=1.385, thickness d4=116 nm). The thin films of these layers can be formed by a process such as vacuum evaporation or the like.

Figure 2:
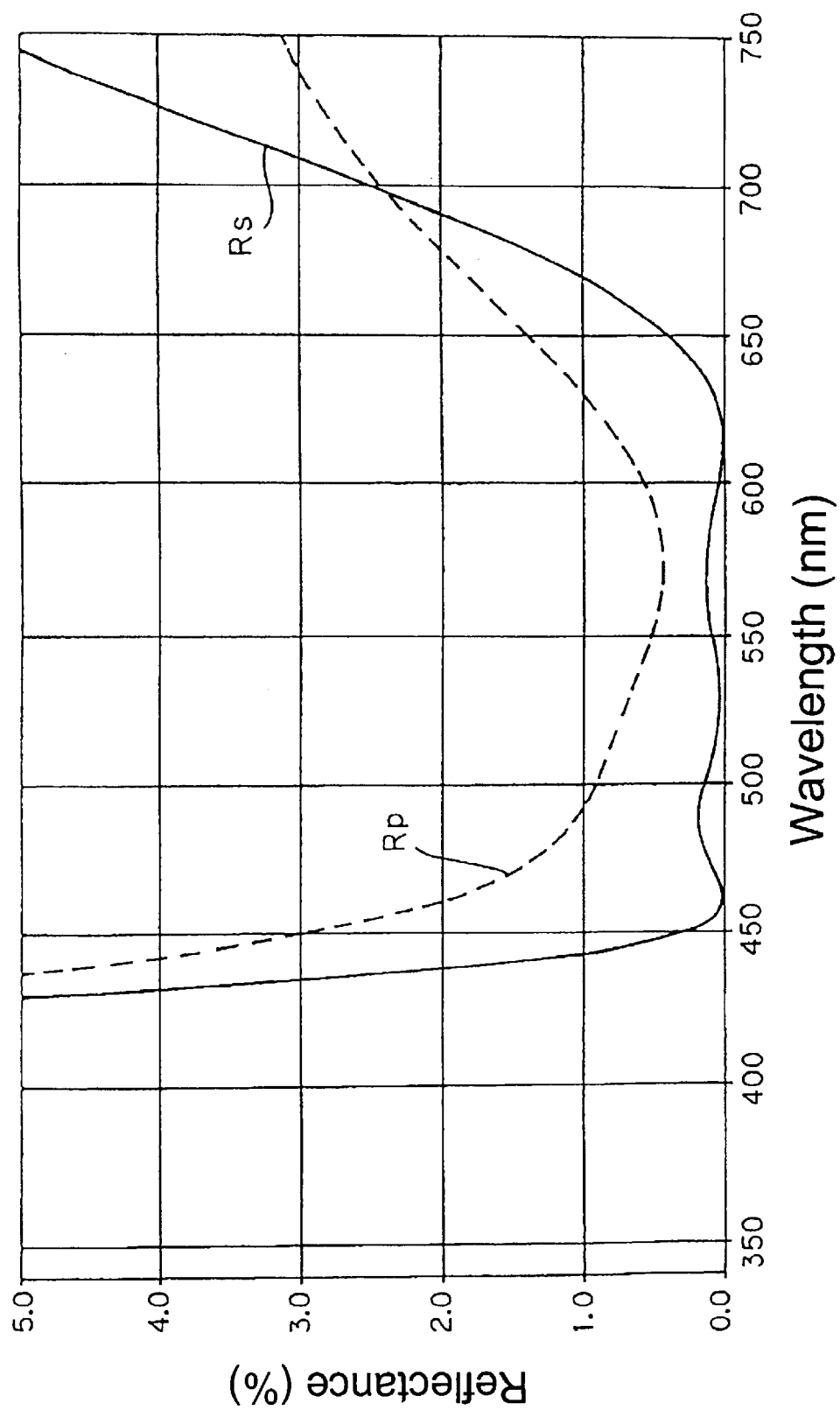
FIG. 2 shows a reflectance of the antireflection coating according to the first embodiment.

A computer-simulated reflectance characteristic of the antireflection coating of this structure at an incident angle of 45 degrees is as shown in FIG. 2. In FIG. 2, the vertical axis represents the reflectance (in percent) and the horizontal axis represents the wavelength (in nm). According to FIG. 2, in the neighborhood of the design dominant wavelength $\lambda_0$ (550 nm), although the reflectance Rp of the light of the p-polarized component is high, the reflectance Rs of the light of the s-polarized component is low.

Although it is desirable to structure an antireflection coating so that the reflectance Rs of the light of the s-polarized component and the reflectance Rp of the light of the p-polarized component are both low in a range where the incident angle is large, this is difficult to realize. For this reason, by structuring the antireflection coating so that the reflectance Rs of the light of the s-polarized component is lower than the reflectance Rp of the light of the p-polarized component like this embodiment, the reflectance Rs of the light of the s-polarized component can be reduced. Consequently, by using optical parts to which this antireflection coating is applied for an optical apparatus mainly using the light of the s-polarized component, the problem of the double image can be reduced.

Figure 4:
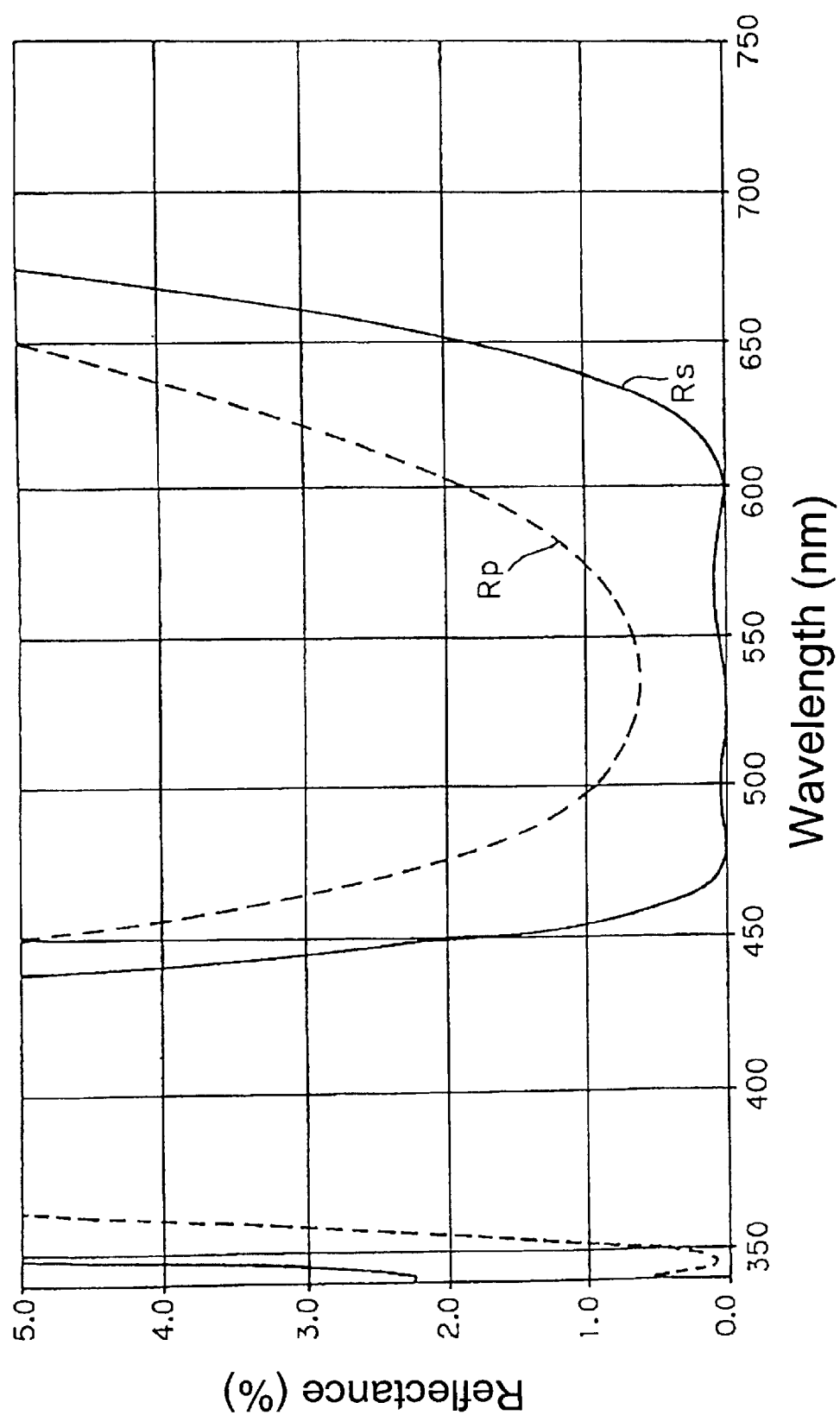
FIG. 4 shows a reflectance of the antireflection coating according to the second embodiment.

FIG. 3 shows the structure of an antireflection coating according to a second embodiment. The design dominant wavelength $\lambda_0$ is 550 nm. In this embodiment, compared to the first embodiment, the thicknesses d are changed and the material of the second layer is changed to $Al_2O_3$ (refractive index n2=1.62). A computer-simulated reflectance characteristic of the antireflection coating of this structure at an incident angle of 45 degrees is as shown in FIG. 4. According to FIG. 4, like the first embodiment, in the neighborhood of the design dominant wavelength $\lambda_0$ (550 nm), the reflectance Rs of the light of the s-polarized component is lower than the reflectance Rp of the light of the p-polarized component, and the reflectance Rs of the light of the s-polarized component is low.

Figure 6:
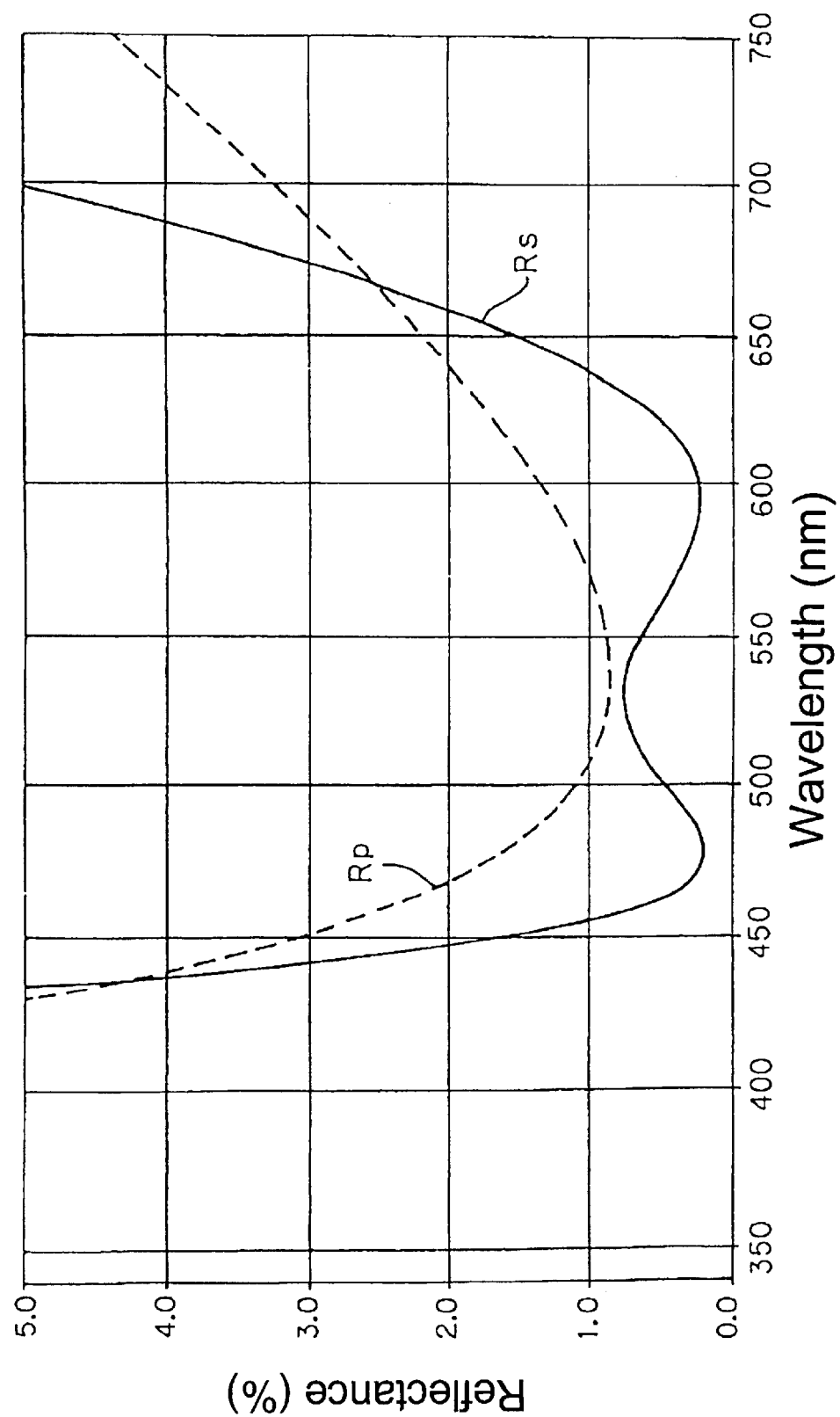
FIG. 6 shows a reflectance of the antireflection coating according to the third embodiment.

FIG. 5 shows the structure of an antireflection coating according to a third embodiment. The design dominant wavelength $\lambda_0$ is 550 nm. In this embodiment, compared to the second embodiment, the thicknesses d are changed and the material of the fourth layer is changed to $SiO_2$ (refractive index n4=1.47). A computer-simulated reflectance characteristic of the antireflection coating of this structure at an incident angle of 45 degrees is as shown in FIG. 6. According to FIG. 6, like the first embodiment, in the neighborhood of the design dominant wavelength $\lambda_0$ (550 nm), the reflectance Rs of the light of the s-polarized component is lower than the reflectance Rp of the light of the p-polarized component, and the reflectance Rs of the light of the s-polarized component is low.

Figure 8:
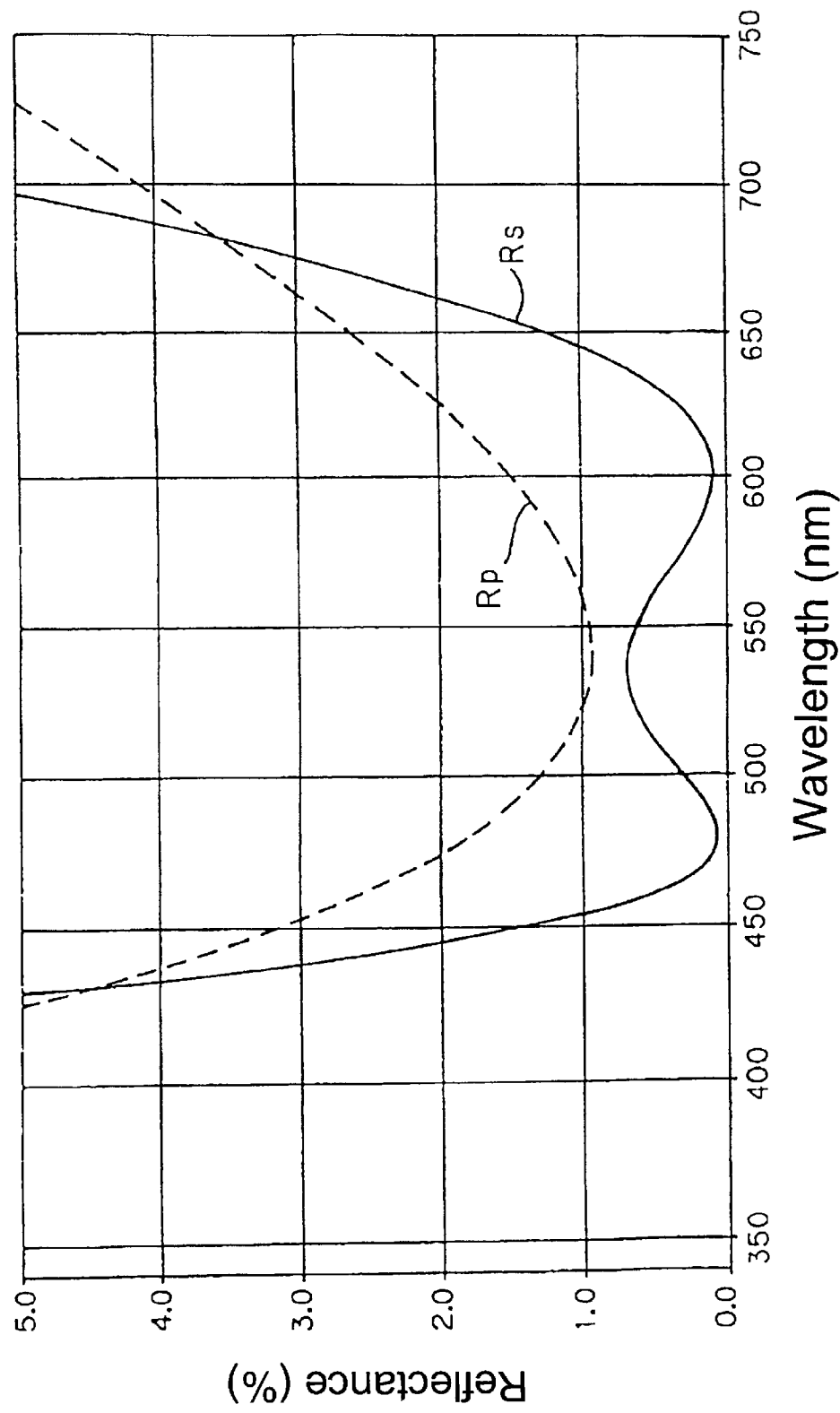
FIG. 8 shows a reflectance of the antireflection coating according to the fourth embodiment.

FIG. 7 shows the structure of an antireflection coating according to a fourth embodiment. The design dominant wavelength $\lambda_0$ is 550 nm. In this embodiment, compared to the third embodiment, the thicknesses d are changed and the material of the second layer is changed to MgO (refractive index n2=1.75). A computer-simulated reflectance characteristic of the antireflection coating of this structure at an incident angle of 45 degrees is as shown in FIG. 8. According to FIG. 8, like the first embodiment, in the neighborhood of the design dominant wavelength $\lambda_0$ (550 nm), the reflectance Rs of the light of the s-polarized component is lower than the reflectance Rp of the light of the p-polarized component, and the reflectance Rs of the light of the s-polarized component is low.

Figure 10:
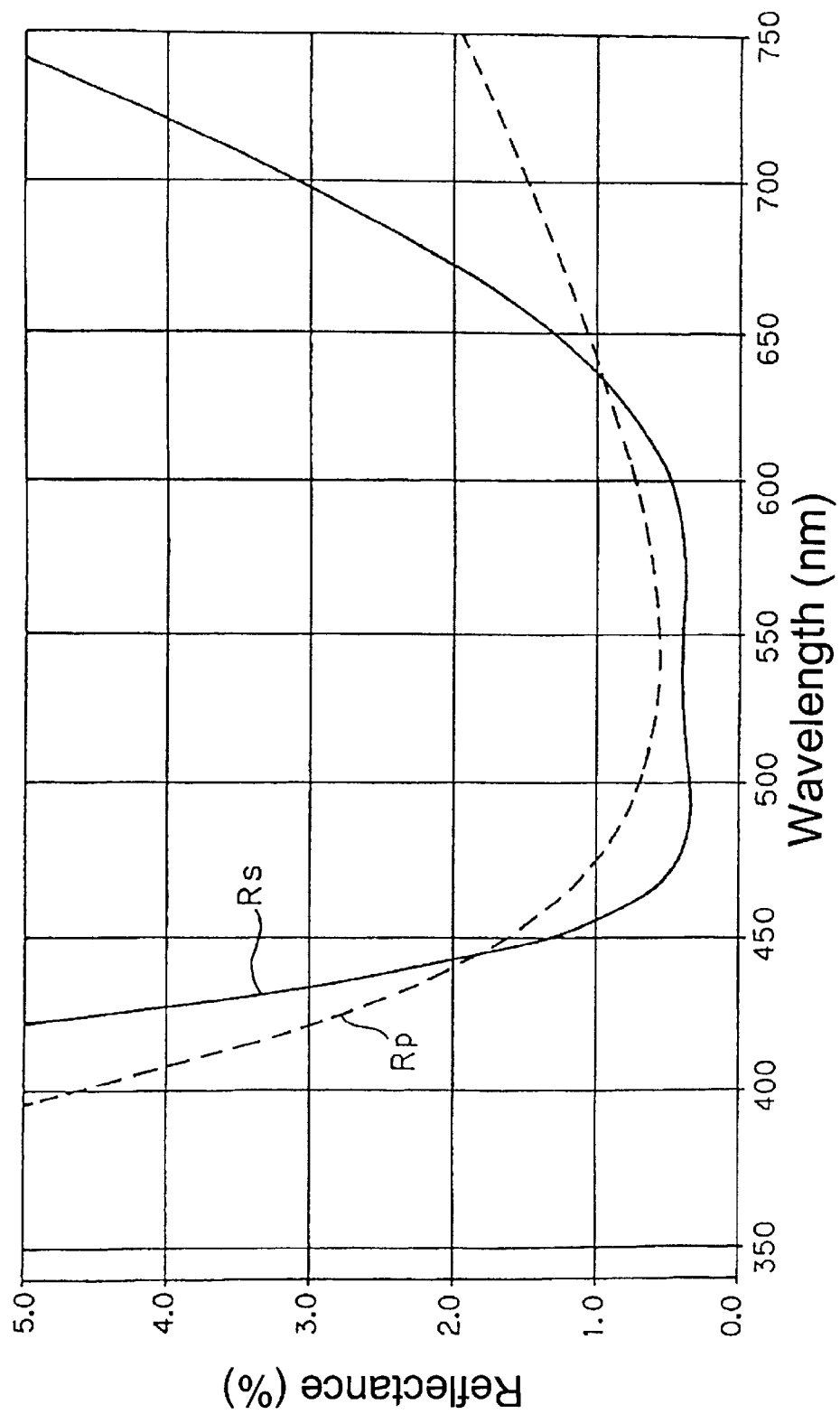
FIG. 10 shows a reflectance of the antireflection coating according to the fifth embodiment.

FIG. 9 shows the structure of an antireflection coating according to a fifth embodiment. The design dominant wavelength $\lambda_0$ is 550 nm. In this embodiment, compared to the second embodiment, the thicknesses d are changed and the material of the first layer is changed to $SiO_2$ (refractive index n1=1.47). A computer-simulated reflectance characteristic of the antireflection coating of this structure at an incident angle of 45 degrees is as shown in FIG. 10. According to FIG. 10, like the first embodiment, in the neighborhood of the design dominant wavelength $\lambda_0$ (550 nm), the reflectance Rs of the light of the s-polarized component is lower than the reflectance Rp of the light of the p-polarized component, and the reflectance Rs of the light of the s-polarized component is low.

Figure 12:
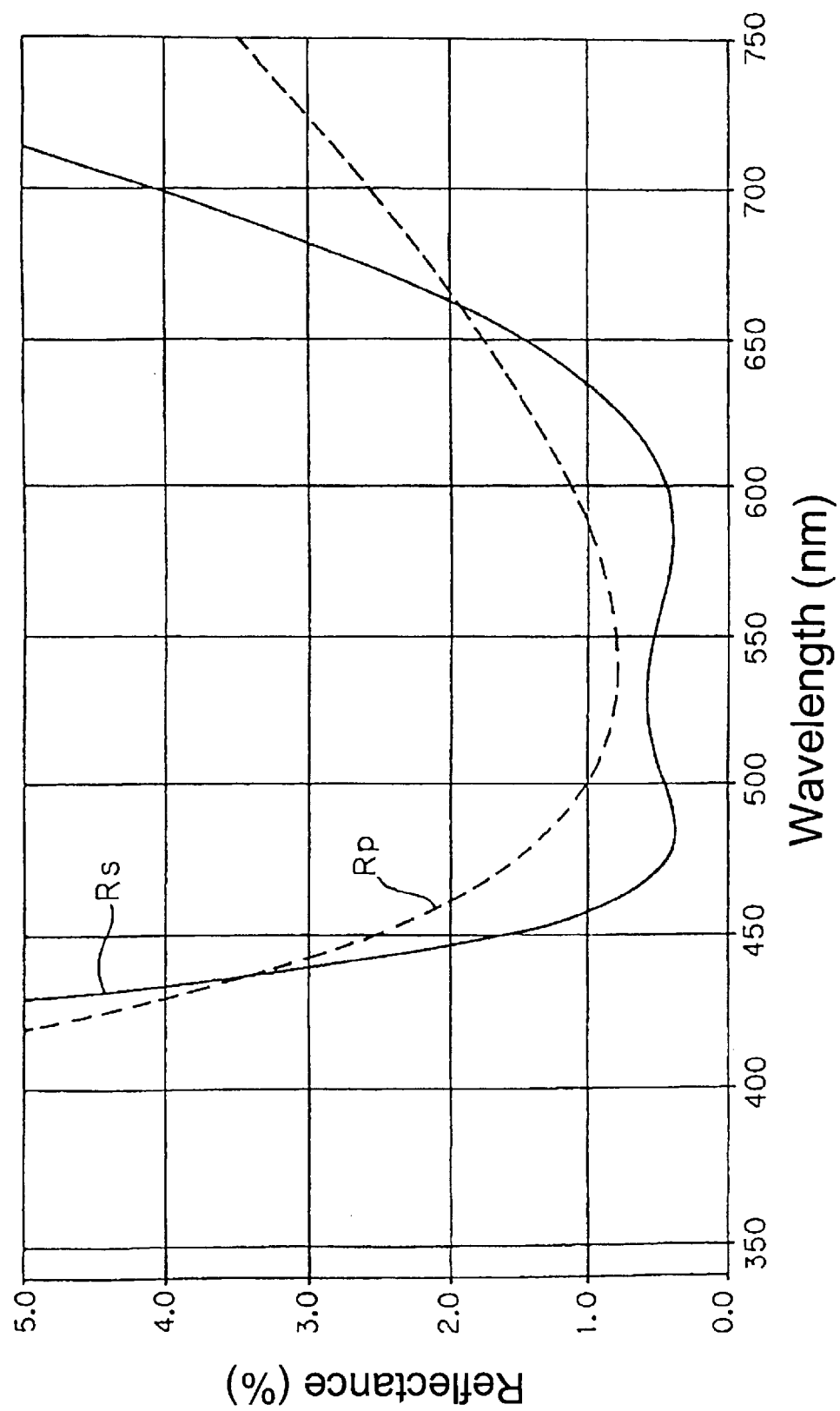
FIG. 12 shows a reflectance of the antireflection coating according to the sixth embodiment.

FIG. 11 shows the structure of an antireflection coating according to a sixth embodiment. The design dominant wavelength $\lambda_0$ is 550 nm. In this embodiment, compared to the fourth embodiment, the thicknesses d are changed and the material of the first layer is changed to $SiO_2$ (refractive index n1=1.47). A computer-simulated reflectance characteristic of the antireflection coating of this structure at an incident angle of 45 degrees is as shown in FIG. 12. According to FIG. 12, like the first embodiment, in the neighborhood of the design dominant wavelength $\lambda_0$ (550 nm), the reflectance Rs of the light of the s-polarized component is lower than the reflectance Rp of the light of the p-polarized component, and the reflectance Rs of the light of the s-polarized component is low.

Figure 14:
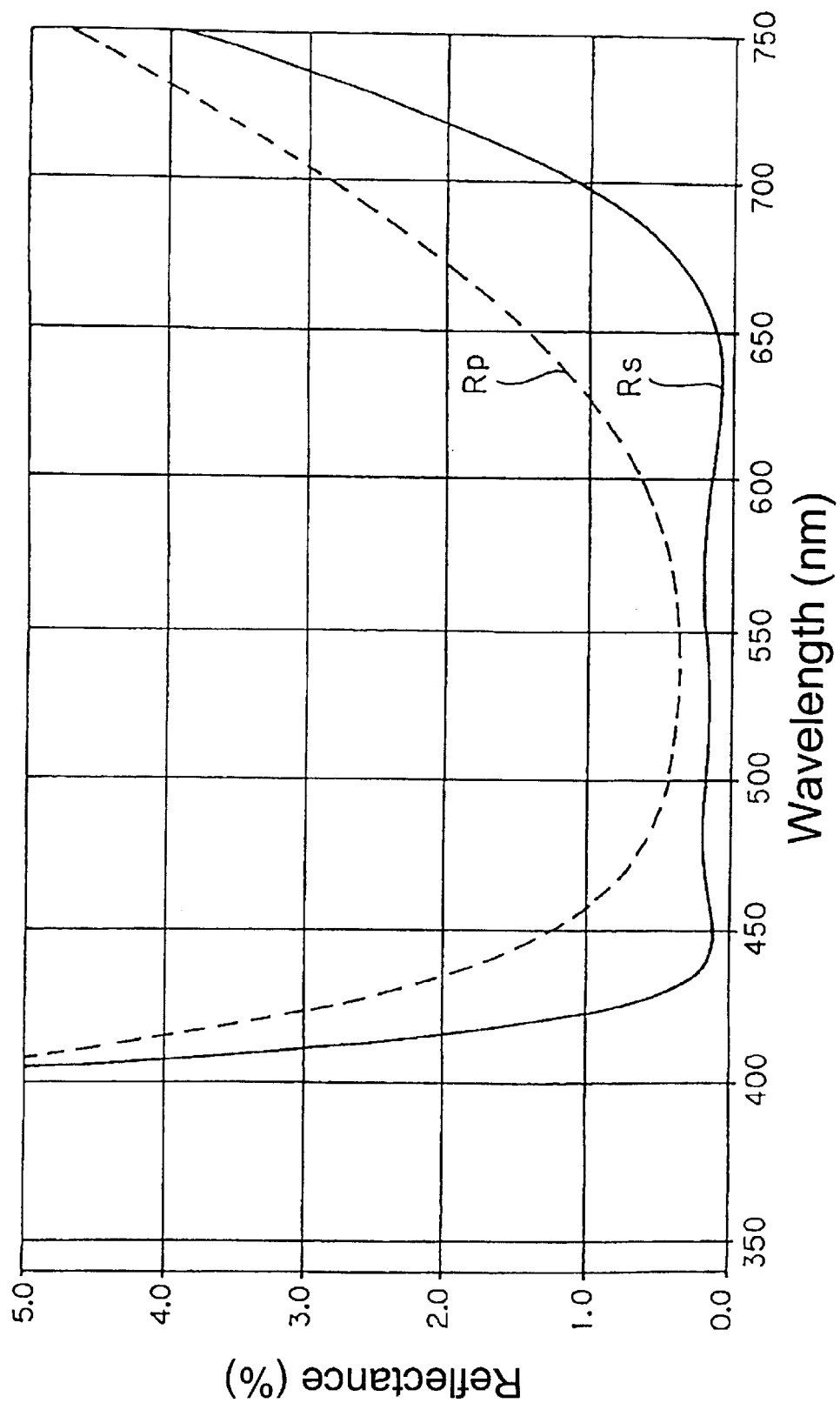
FIG. 14 shows a reflectance of the antireflection coating according to the seventh embodiment.

FIG. 13 shows the structure of an antireflection coating according to a seventh embodiment. The design dominant wavelength $\lambda_0$ is 550 nm. In this embodiment, compared to the first embodiment, the thicknesses d are changed and the material of the substrate is changed (refractive index ns=1.76). A computer-simulated reflectance characteristic of the antireflection coating of this structure at an incident angle of 45 degrees is as shown in FIG. 14. According to FIG. 14, like the first embodiment, in the neighborhood of the design dominant wavelength $\lambda_0$ (550 nm), the reflectance Rs of the light of the s-polarized component is lower than the reflectance Rp of the light of the p-polarized component, and the reflectance Rs of the light of the s-polarized component is low.

In any of the second to the seventh embodiments, when the incident angle is 45 degrees, in the neighborhood of the design dominant wavelength $\lambda_0$ (550 nm), although the reflectance Rp of the light of the p-polarized component is high, the reflectance Rs of the light of the s-polarized component is low. Consequently, similar effects as those of the first embodiment are obtained.

As described above, in any of the antireflection coatings of the first to the seventh embodiments, the reflectance Rs of the light of the s-polarized component can be reduced, and according to computer simulations, when the refractive indices n and the thicknesses d of the first, the second, the third and the fourth layers are n1, n2, n3 and n4, and d1, d2, d3 and d4, by satisfying the following expressions (1) to (5):

$$n3 > n2 > n1 \geq n4 \tag{1}$$

$$0 < (n1*d1) \leq 0.75*\lambda_0 \tag{2}$$

$$0.20*\lambda_0 \leq (n2*d2) \leq 0.43*\lambda_0 \quad (3)$$

$$0.07*\lambda_0 \leq (n3*d3) \leq 1.10*\lambda_0 \quad (4)$$

$$0.28*\lambda_0 \leq (n4*d4) \leq 0.35*\lambda_0 \quad (5)$$

the reflectance of the light of the s-polarized component can be reduced in the small-incident-angle range to the large-incident-angle range in the neighborhood of 45 degrees.

Further, when the refractive index of the substrate is ns, by satisfying the following expressions (6) to (10) as well as the expressions (1) to (5):

$$1.50 \leq ns \leq 1.85 \quad (6)$$

$$1.35 \leq n1 \leq 1.48 \quad (7)$$

$$1.47 \leq n2 \leq 1.80 \quad (8)$$

$$2.30 \leq n3 \leq 2.60 \quad (9)$$

$$1.35 \leq n4 \leq 1.48 \quad (10)$$

the reflectance of the light of the s-polarized component can further be reduced in the small-incident-angle range to the large-incident-angle range in the neighborhood of 45 degrees.

As materials having the above-mentioned refractive indices, the following can be used: for the first layer, $MgF_2$, $Na_5Al_3F_{14}$, $SiO_2$, and the like; for the second layer, $SiO_2$, $YF_3$ (yttrium fluoride), $Al_2O_3$, $Y_2O_3$ (yttrium oxide), MgO, and the like; for the third layer, $TiO_2$, ZnS (zinc sulfide), and the like; and for the fourth layer, $MgF_2$, $Na_5Al_3F_{14}$, $SiO_2$, and the like. A thin film made of one or a plurality of these materials may be formed in each layer, or a thin film whose main component is one or a plurality of these materials may be formed in each layer.

When an $MgF_2$ (n1=1.385) film is formed as the first layer, it is desirable to satisfy all of the expressions (1) to (10) because the reflectance Rs of the light of the s-polarized component can be reduced until it is lower than the reflectance Rp of the light of the p-polarized component in the neighborhood of the design dominant wavelength $\lambda_0$ in the small-incident-angle range to the large-incident-angle range in the neighborhood of 45 degrees.

When an $SiO_2$ film is formed as the first layer like the fifth and the sixth embodiments, it is desirable to replace the expression (2) by the following expression (2'):

$$0.15*\lambda_0 \leq (n1*d1) \leq 0.75*\lambda_0 \quad (2')$$

because the reflectance Rs of the light of the s-polarized component can be reduced until it is lower than the reflectance Rp of the light of the p-polarized component in the neighborhood of the design dominant wavelength $\lambda_0$ in the small-incident-angle range to the large-incident-angle range in the neighborhood of 45 degrees.

Embodiments of Five-Layer Structure:

Embodiments of the five-layer structure will be described with reference to the drawings. FIG. 15 shows the structure of an antireflection coating according to an eighth embodiment. The design dominant wavelength $\lambda_0$ is 550 nm. On a substrate (refractive index ns=1.52) comprising optical parts such as lenses and prisms, the following thin films are formed from the substrate side: a first layer of $MgF_2$ (refractive index n1=1.385, thickness d1=224 nm); a second layer of $TiO_2$ (titanium oxide refractive index n2=2.45, thickness d2=18 nm); a third layer of $MgF_2$ (refractive index n3=1.385, thickness d3=18 nm); a fourth layer of $TiO_2$ (refractive index n4=2.45, thickness d4=90 nm); and a fifth layer of $MgF_2$ (refractive index n5=1.385, thickness d5=108 nm). The thin films of these layers can be formed by vacuum evaporation or the like.

Figure 16:
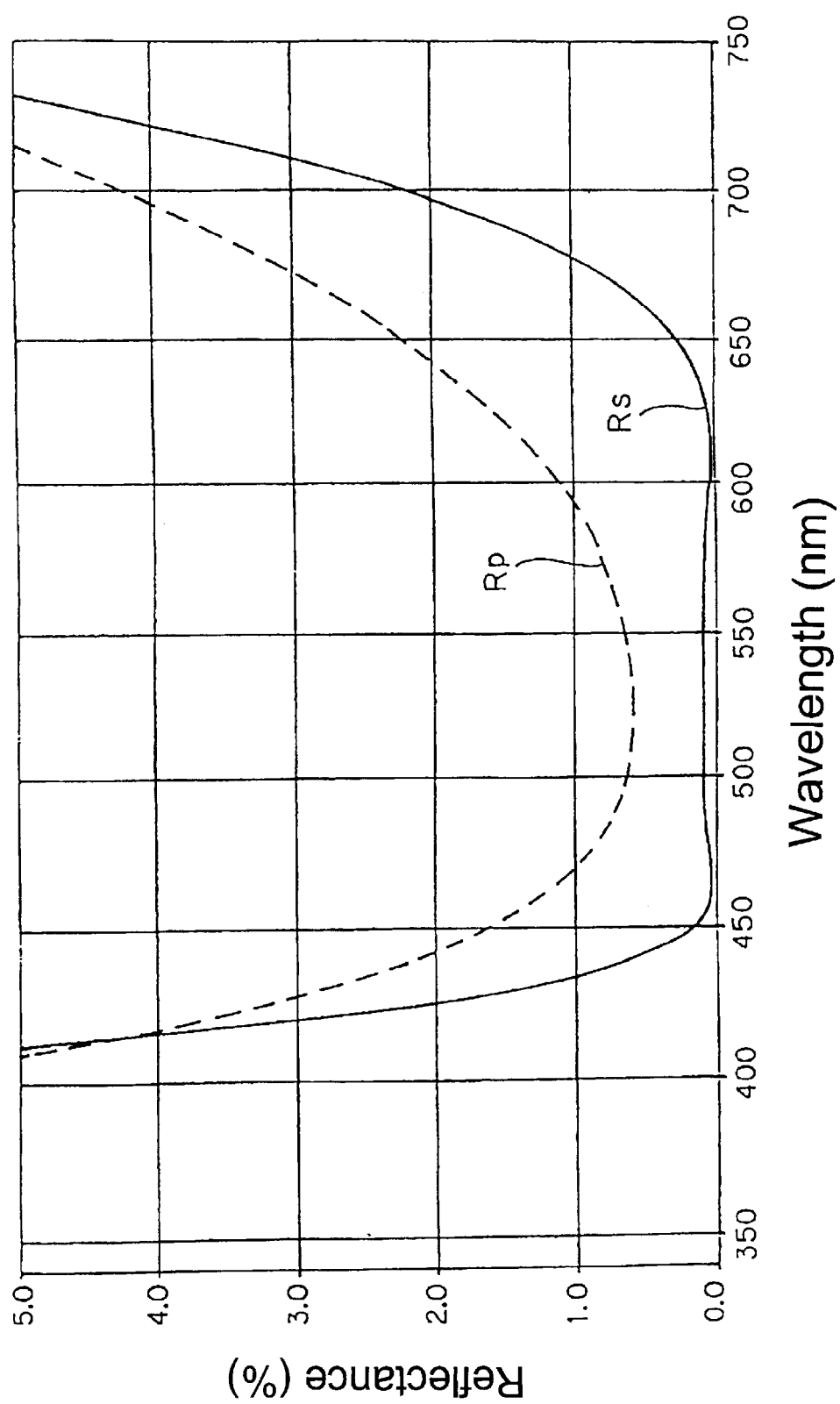
FIG. 16 shows a reflectance of the antireflection coating according to the eighth embodiment.

A computer-simulated reflectance characteristic of the antireflection coating of this structure at an incident angle of 45 degrees is as shown in FIG. 16. According to FIG. 16, in the neighborhood of the design dominant wavelength $\lambda_0$ (550 nm), although the reflectance Rp of the light of the p-polarized component is high, the reflectance Rs of the light of the s-polarized component is low.

Although it is desirable to structure an antireflection coating so that the reflectance Rs of the light of the s-polarized component and the reflectance Rp of the light of the p-polarized component are both low in a range where the incident angle is large, this is difficult to realize. For this reason, by structuring the antireflection coating so that the reflectance Rs of the light of the s-polarized component is lower than the reflectance Rp of the light of the p-polarized component like this embodiment, the reflectance Rs of the light of the s-polarized component can be reduced. Consequently, by using optical parts to which this antireflection coating is applied for an optical apparatus mainly using the light of the s-polarized component, the problem of the double image can be reduced.

Figure 18:
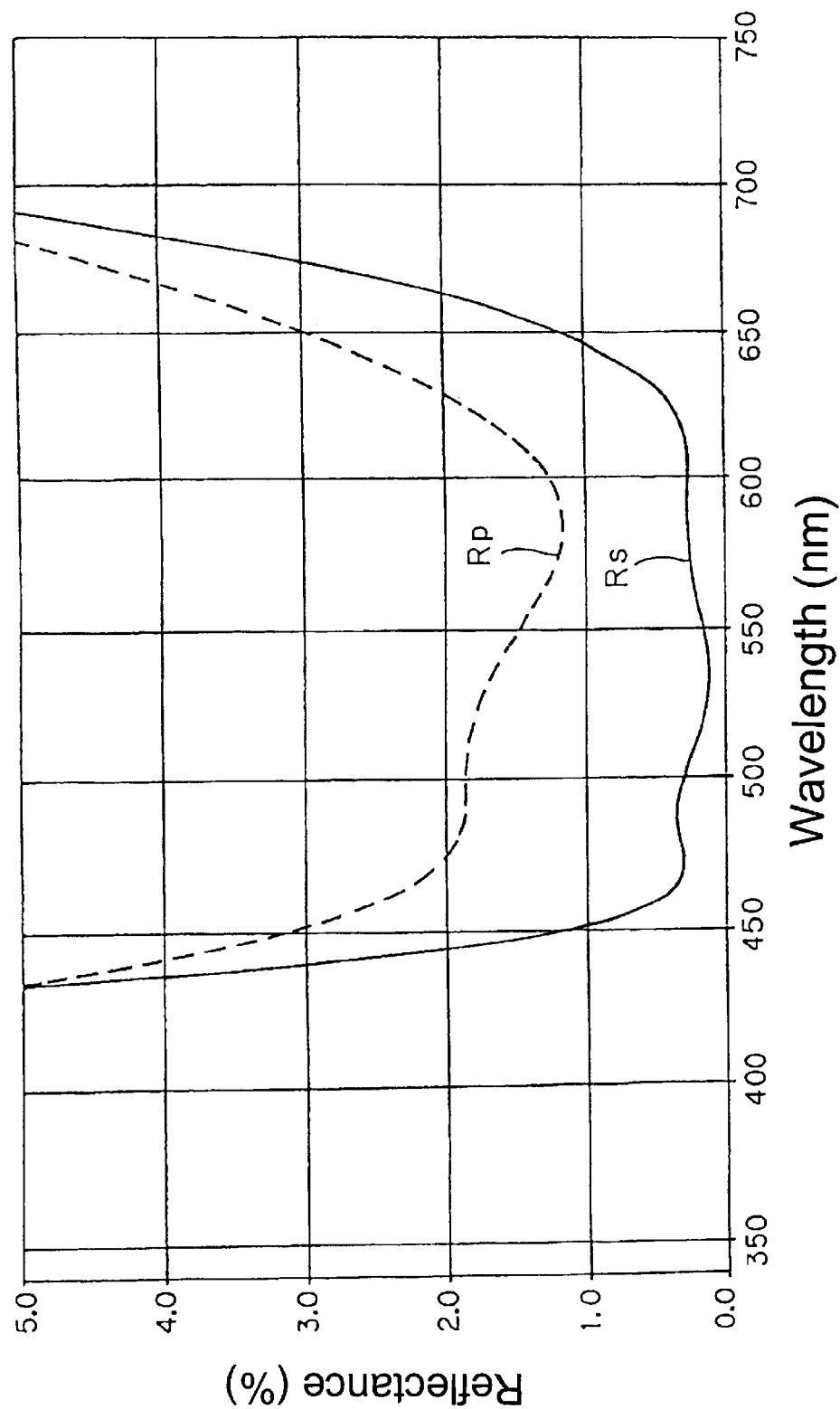
FIG. 18 shows a reflectance of the antireflection coating according to the ninth embodiment.

FIG. 17 shows the structure of an antireflection coating according to a ninth embodiment. The design dominant wavelength $\lambda_0$ is 550 nm. In this embodiment, compared to the eighth embodiment, the thicknesses d are changed and the material of the second layer is changed to $ZrTiO_4$ (refractive index n2=2.1). A computer-simulated reflectance characteristic of the antireflection coating of this structure at an incident angle of 45 degrees is as shown in FIG. 18. According to FIG. 18, like the eighth embodiment, in the neighborhood of the design dominant wavelength $\lambda_0$ (550 nm), the reflectance Rs of the light of the s-polarized component is lower than the reflectance Rp of the light of the p-polarized component, and the reflectance Rs of the light of the s-polarized component is low.

Figure 20:
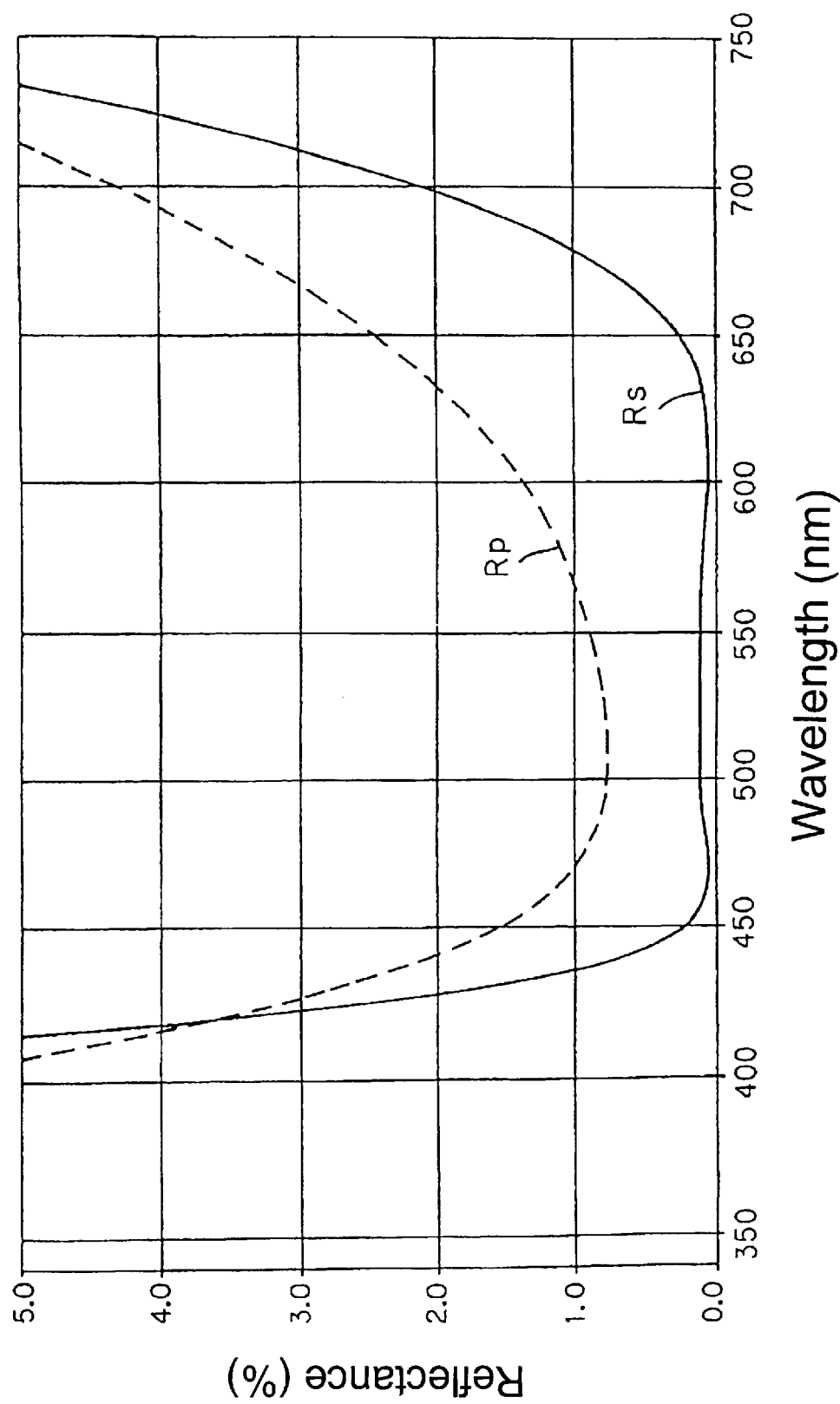
FIG. 20 shows a reflectance of the antireflection coating according to the tenth embodiment.

FIG. 19 shows the structure of an antireflection coating according to a tenth embodiment. The design dominant wavelength $\lambda_0$ is 550 nm. In this embodiment, compared to the ninth embodiment, the thicknesses d are changed. A computer-simulated reflectance characteristic of the antireflection coating of this structure at an incident angle of 45 degrees is as shown in FIG. 20. According to FIG. 20, like the eighth embodiment, in the neighborhood of the design dominant wavelength $\lambda_0$ (550 nm), the reflectance Rs of the light of the s-polarized component is lower than the reflectance Rp of the light of the p-polarized component, and the reflectance Rs of the light of the s-polarized component is low.

Figure 22:
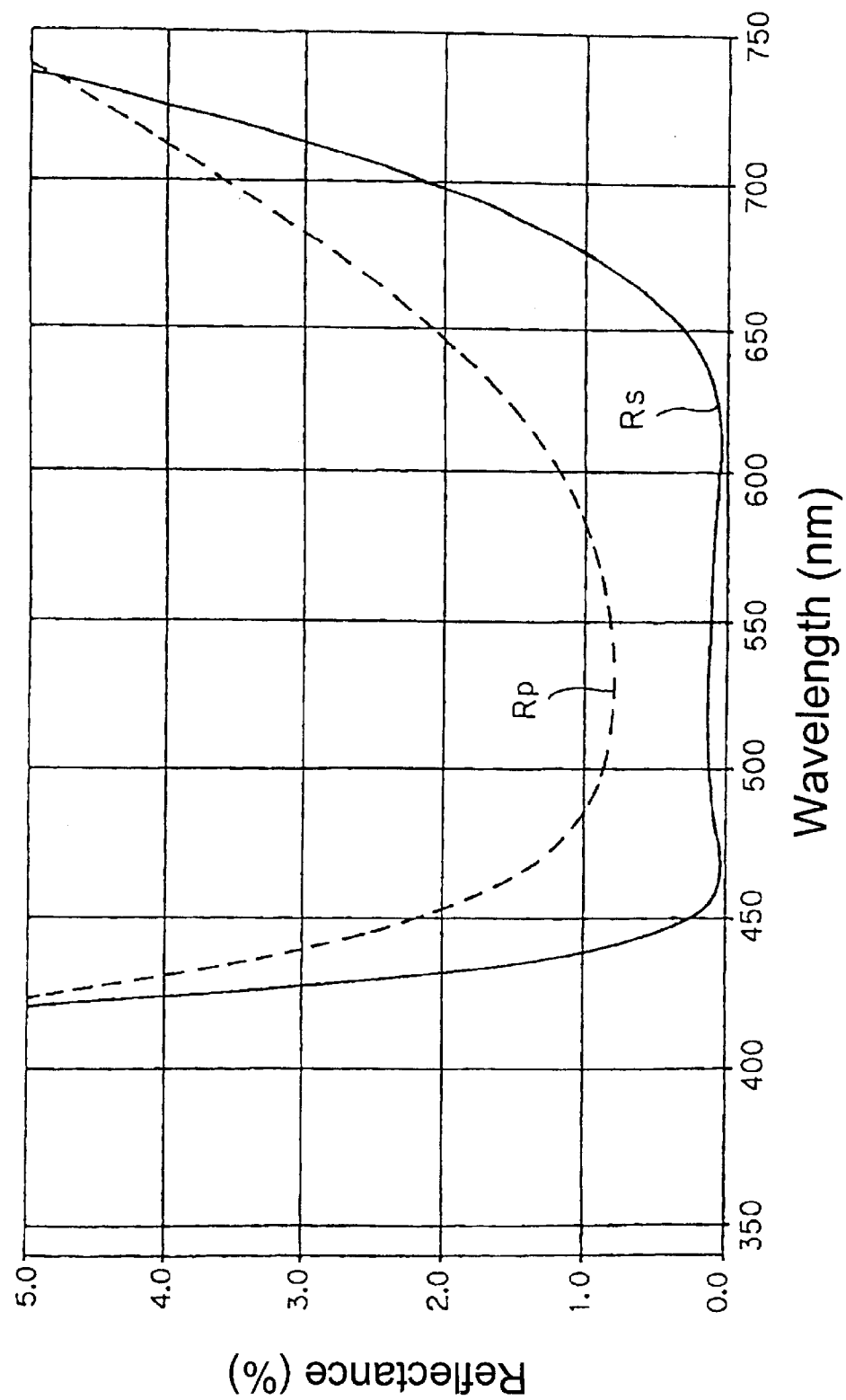
FIG. 22 shows a reflectance of the antireflection coating according to the eleventh embodiment.

FIG. 21 shows the structure of an antireflection coating according to an eleventh embodiment. The design dominant wavelength $\lambda_0$ is 550 nm. In this embodiment, compared to the eighth embodiment, the thicknesses d are changed and the material of the third layer is changed to $Al_2O_3$ (refractive index n3=1.62). A computer-simulated reflectance characteristic of the antireflection coating of this structure at an incident angle of 45 degrees is as shown in FIG. 22. According to FIG. 22, like the eighth embodiment, in the neighborhood of the design dominant wavelength $\lambda_0$ (550 nm), the reflectance Rs of the light of the s-polarized component is lower than the reflectance Rp of the light of the p-polarized component, and the reflectance Rs of the light of the s-polarized component is low.

Figure 24:
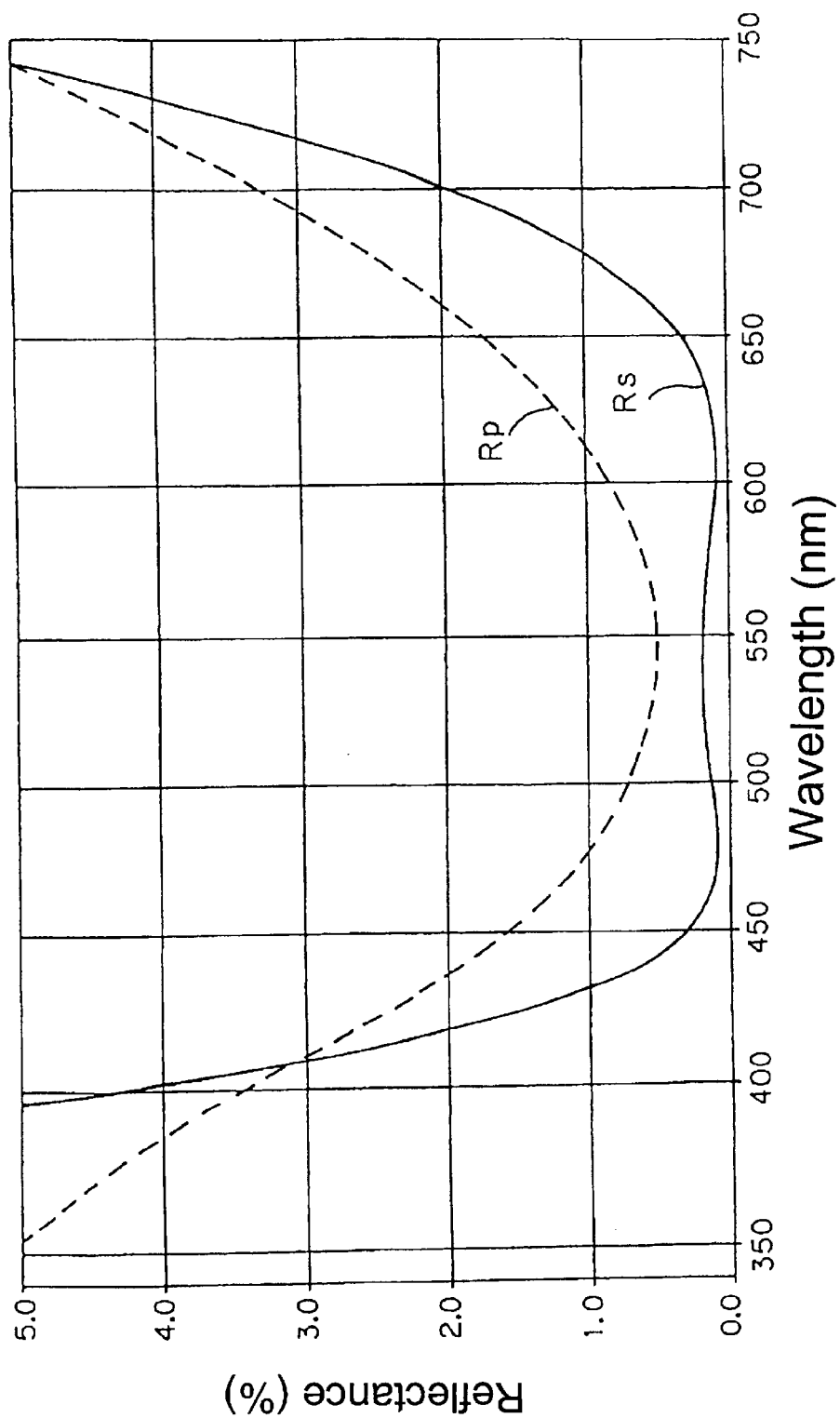
FIG. 24 shows a reflectance of the antireflection coating according to the twelfth embodiment.

FIG. 23 shows the structure of an antireflection coating according to a twelfth embodiment. The design dominant wavelength $\lambda_0$ is 550 nm. In this embodiment, compared to the eleventh embodiment, the thicknesses d are changed and the material of the first layer is changed to SiO$_2$ (refractive index n1=1.47). A computer-simulated reflectance characteristic of the antireflection coating of this structure at an incident angle of 45 degrees is as shown in FIG. 24. According to FIG. 24, like the first embodiment, in the neighborhood of the design dominant wavelength $\lambda_0$ (550 nm), the reflectance Rs of the light of the s-polarized component is lower than the reflectance Rp of the light of the p-polarized component, and the reflectance Rs of the light of the s-polarized component is low.

Figure 26:
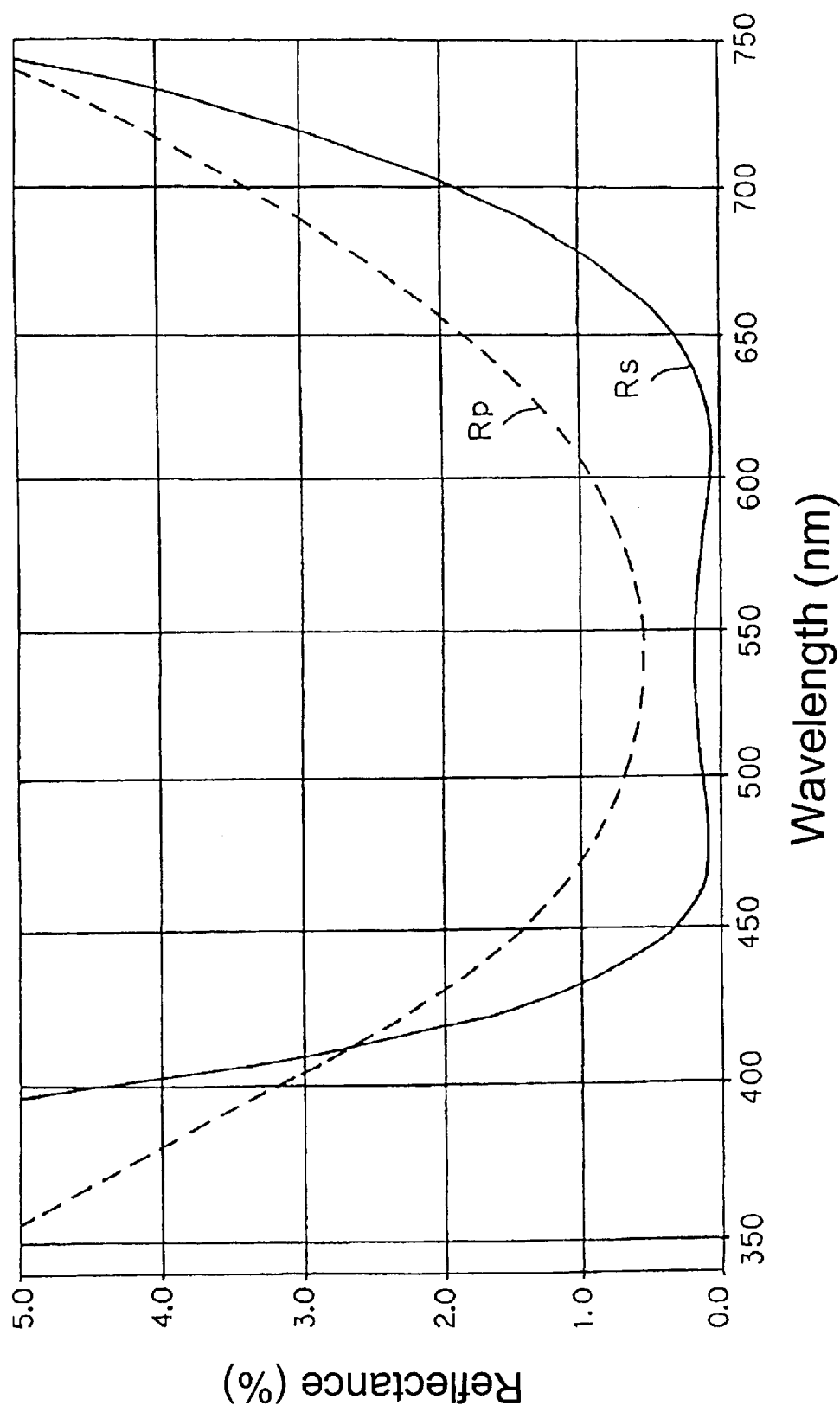
FIG. 26 shows a reflectance of the antireflection coating according to the thirteenth embodiment.

FIG. 25 shows the structure of an antireflection coating according to a thirteenth embodiment. The design dominant wavelength $\lambda_0$ is 550 nm. In this embodiment, compared to the eighth embodiment, the thicknesses d are changed and the materials of the first and the third layers are changed to SiO$_2$ (refractive indices n1, n3=1.47). A computer-simulated reflectance characteristic of the antireflection coating of this structure at an incident angle of 45 degrees is as shown in FIG. 26. According to FIG. 26, like the eighth embodiment, in the neighborhood of the design dominant wavelength $\lambda_0$ (550 nm), the reflectance Rs of the light of the s-polarized component is lower than the reflectance Rp of the light of the p-polarized component, and the reflectance Rs of the light of the s-polarized component is low.

Figure 28:
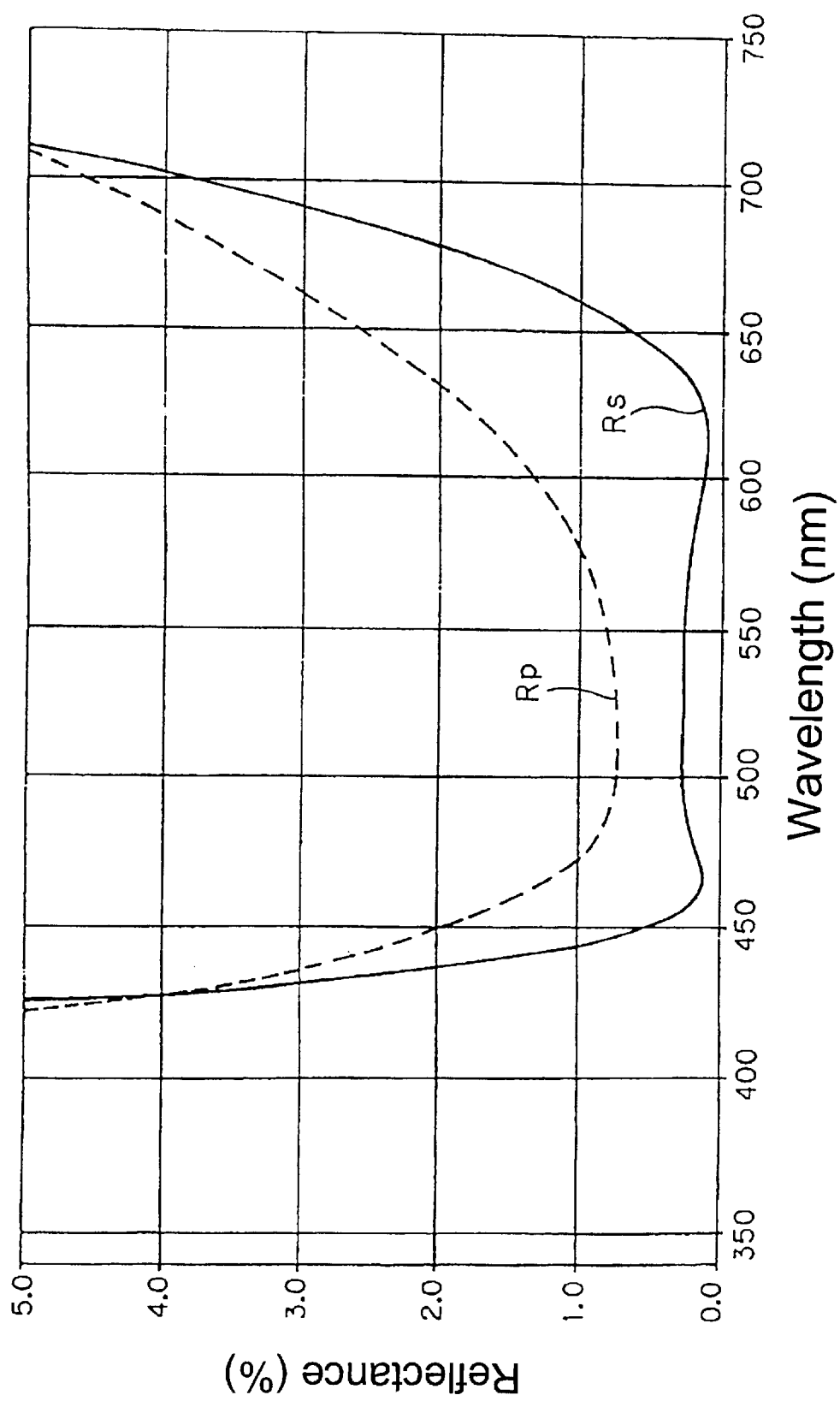
FIG. 28 shows a reflectance of the antireflection coating according to the fourteenth embodiment.

FIG. 27 shows the structure of an antireflection coating according to a fourteenth embodiment. The design dominant wavelength $\lambda_0$ is 550 nm. In this embodiment, compared to the eighth embodiment, the thicknesses d are changed and the materials of the first, the third and the fifth layers are changed to SiO$_2$ (refractive indices n1, n3, n5=1.47). A computer-simulated reflectance characteristic of the antireflection coating of this structure at an incident angle of 45 degrees is as shown in FIG. 28. According to FIG. 28, like the eighth embodiment, in the neighborhood of the design dominant wavelength $\lambda_0$ (550 nm), the reflectance Rs of the light of the s-polarized component is lower than the reflectance Rp of the light of the p-polarized component, and the reflectance Rs of the light of the s-polarized component is low.

Figure 30:
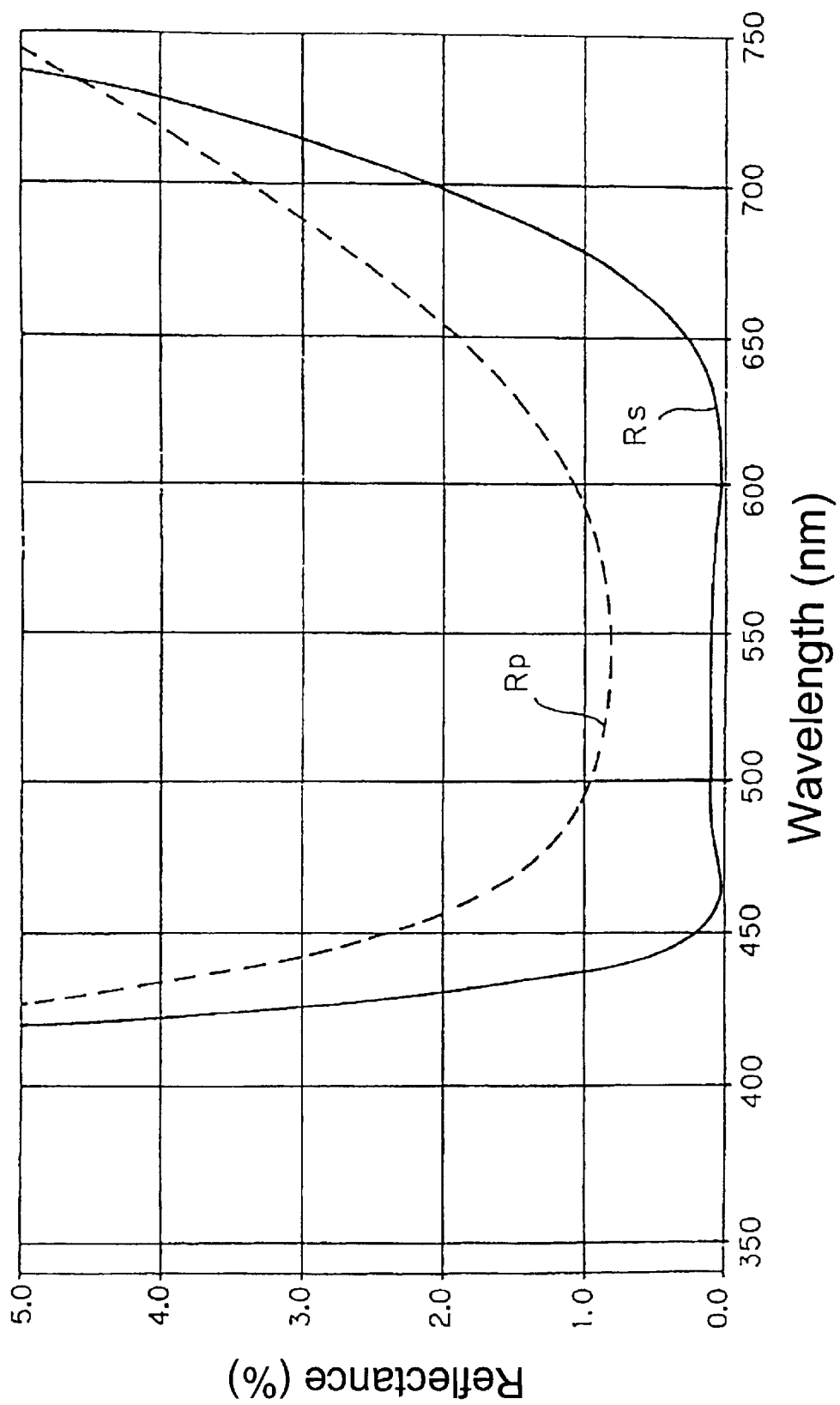
FIG. 30 shows a reflectance of the antireflection coating according to the fifteenth embodiment.

FIG. 29 shows the structure of an antireflection coating according to a fifteenth embodiment. The design dominant wavelength $\lambda_0$ is 550 nm. In this embodiment, compared to the eighth embodiment, the thicknesses d are changed and the material of the third layer is changed to MgO (magnesium oxide, refractive index n3=1.75). A computer-simulated reflectance characteristic of the antireflection coating of this structure at an incident angle of 45 degrees is as shown in FIG. 30. According to FIG. 30, like the eighth embodiment, in the neighborhood of the design dominant wavelength $\lambda_0$ (550 nm), the reflectance Rs of the light of the s-polarized component is lower than the reflectance Rp of the light of the p-polarized component, and the reflectance Rs of the light of the s-polarized component is low.

Figure 32:
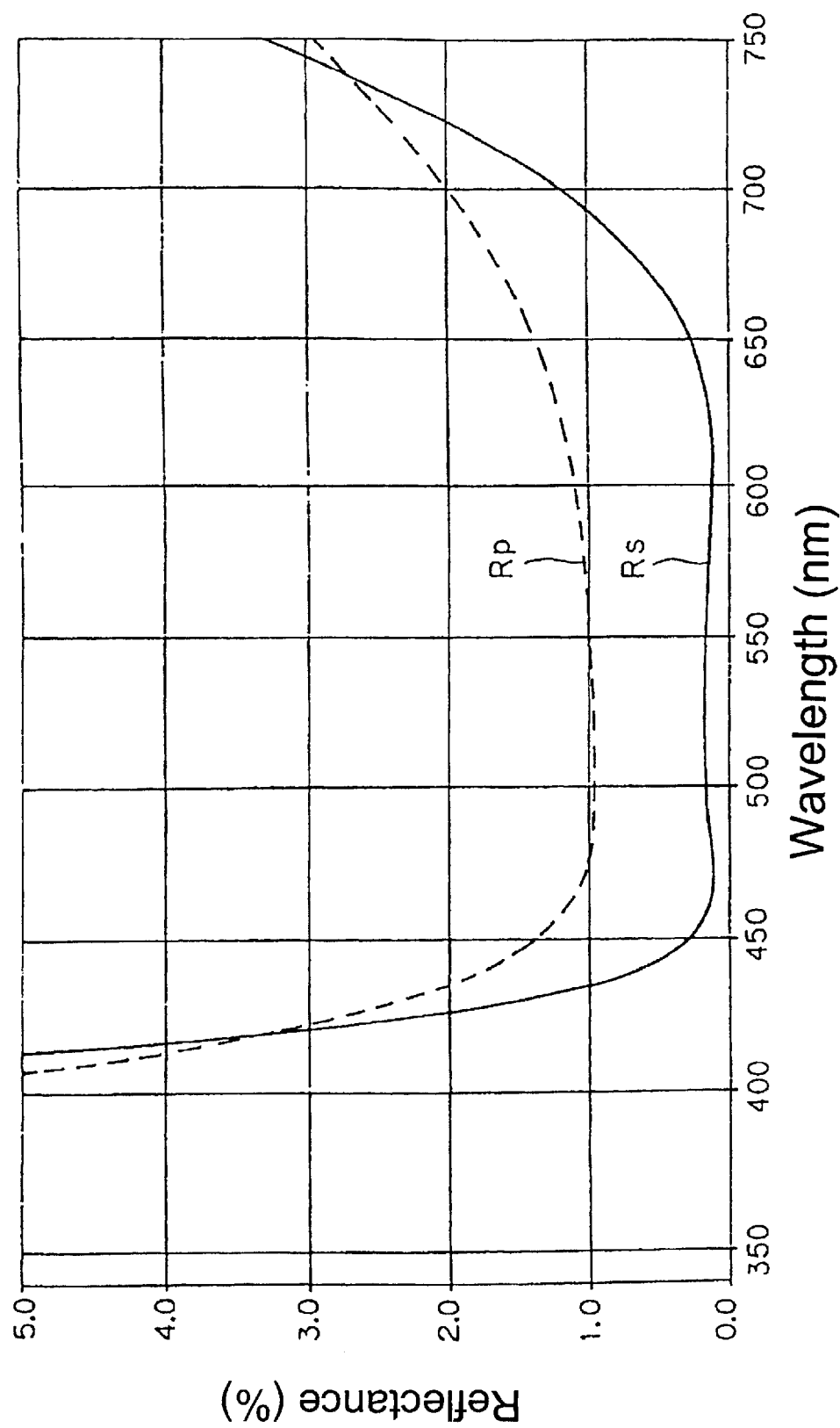
FIG. 32 shows a reflectance of the antireflection coating according to the sixteenth embodiment.
Figure 37:
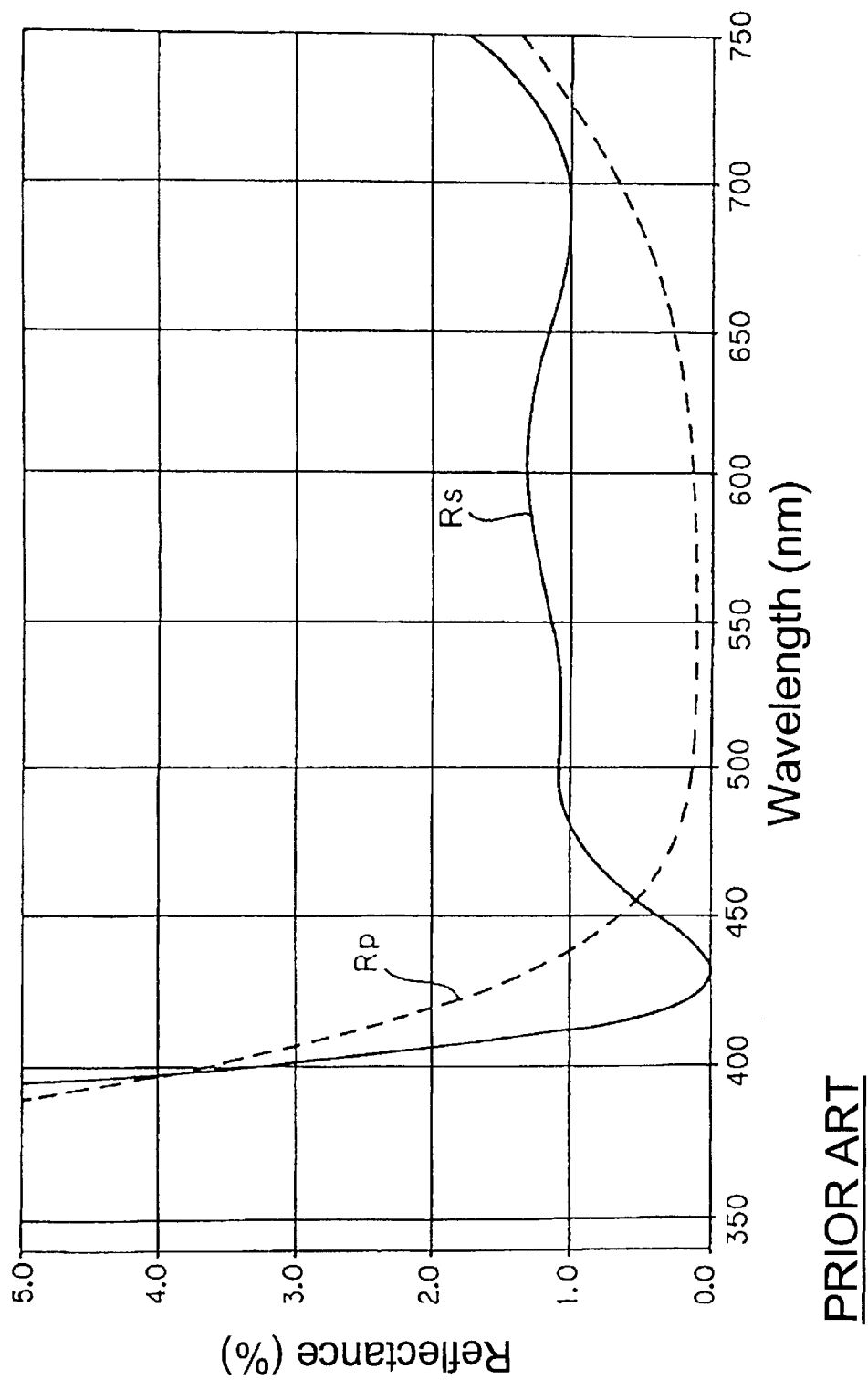
FIG. 37 shows the reflectance of the antireflection coating according to the first prior art.
Figure 38:
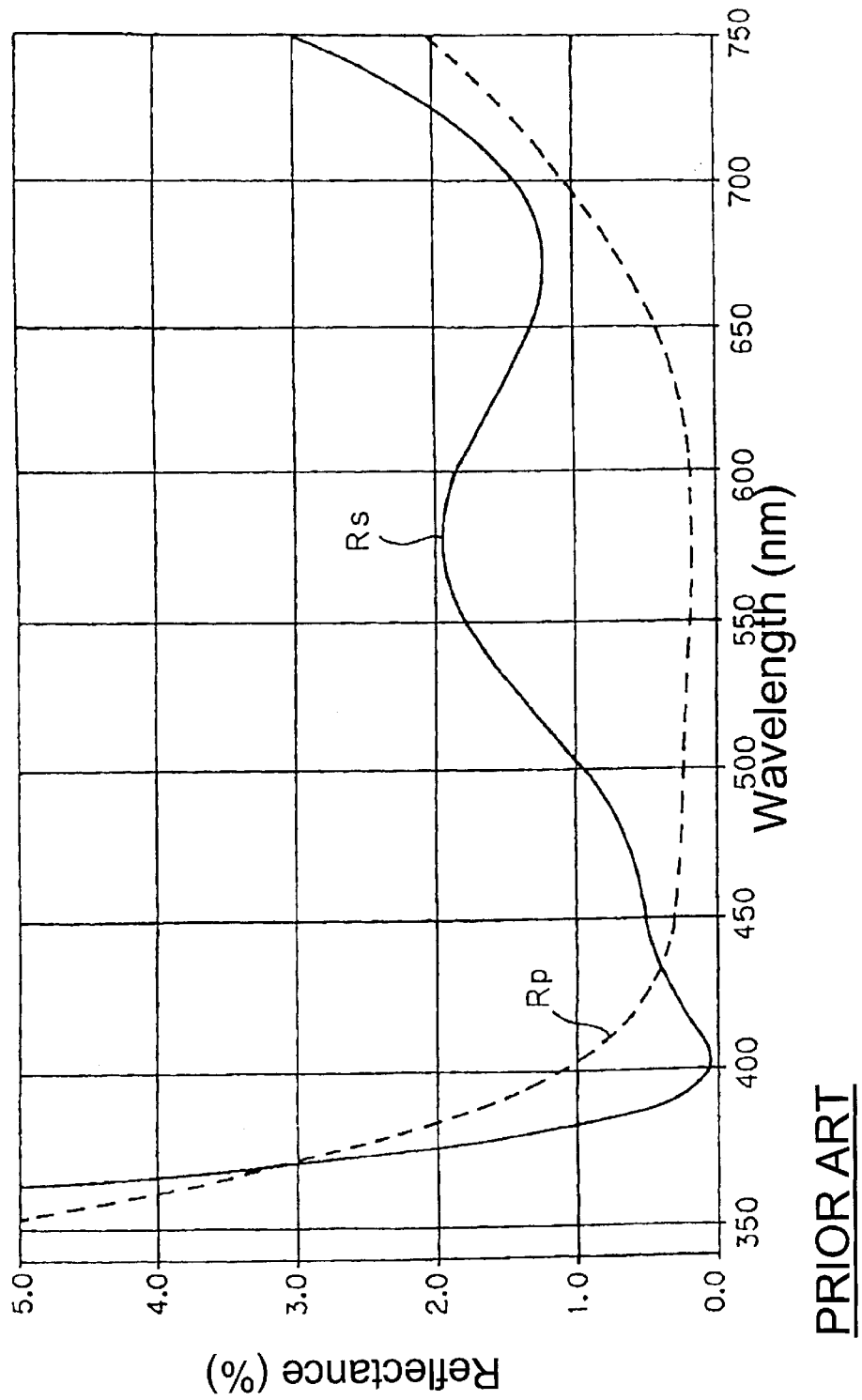
FIG. 38 shows the reflectance of the antireflection coating according to the second prior art.
Figure 39:
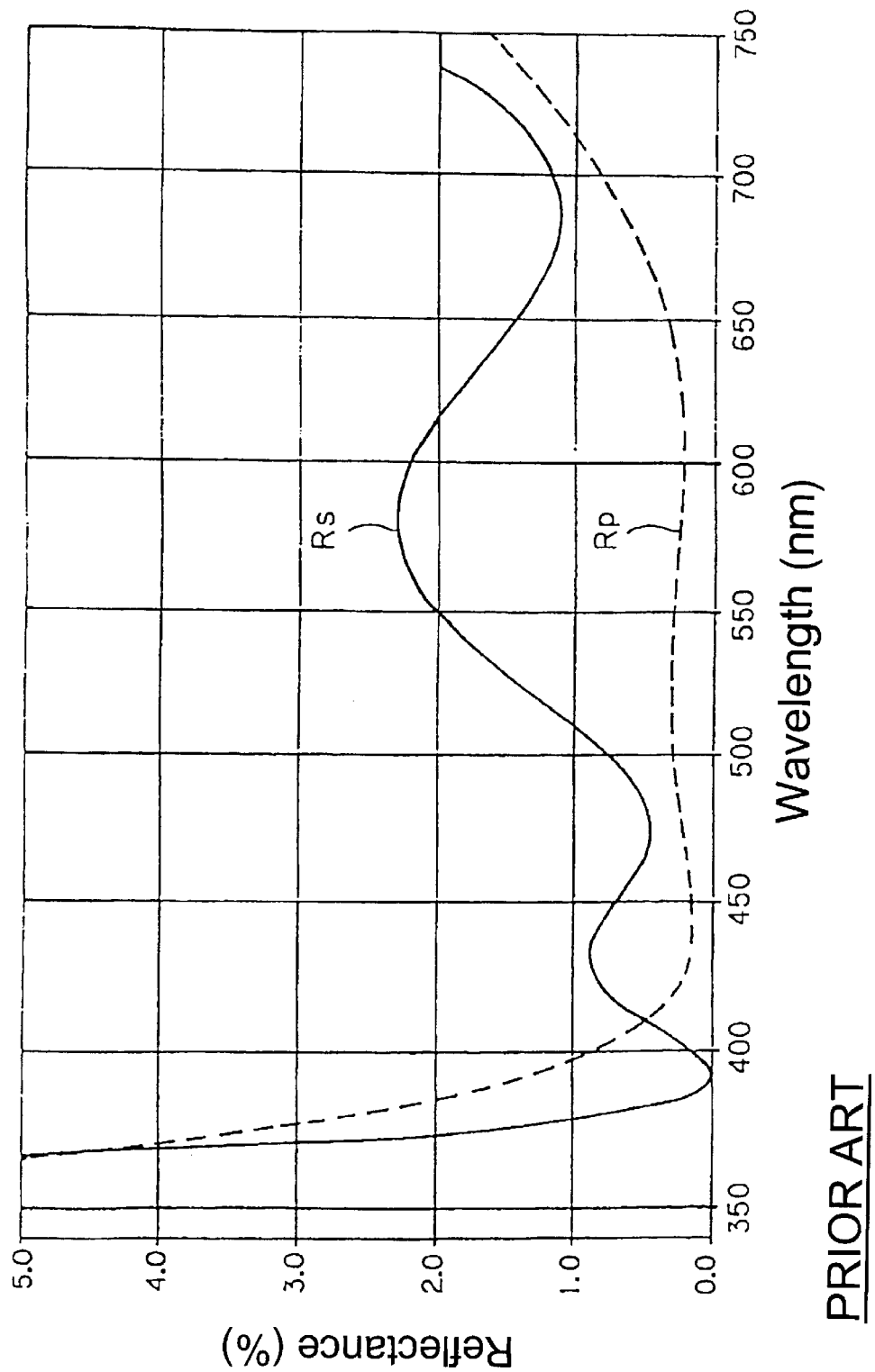
FIG. 39 shows the reflectance of the antireflection coating according to the third prior art.
Figure 40:
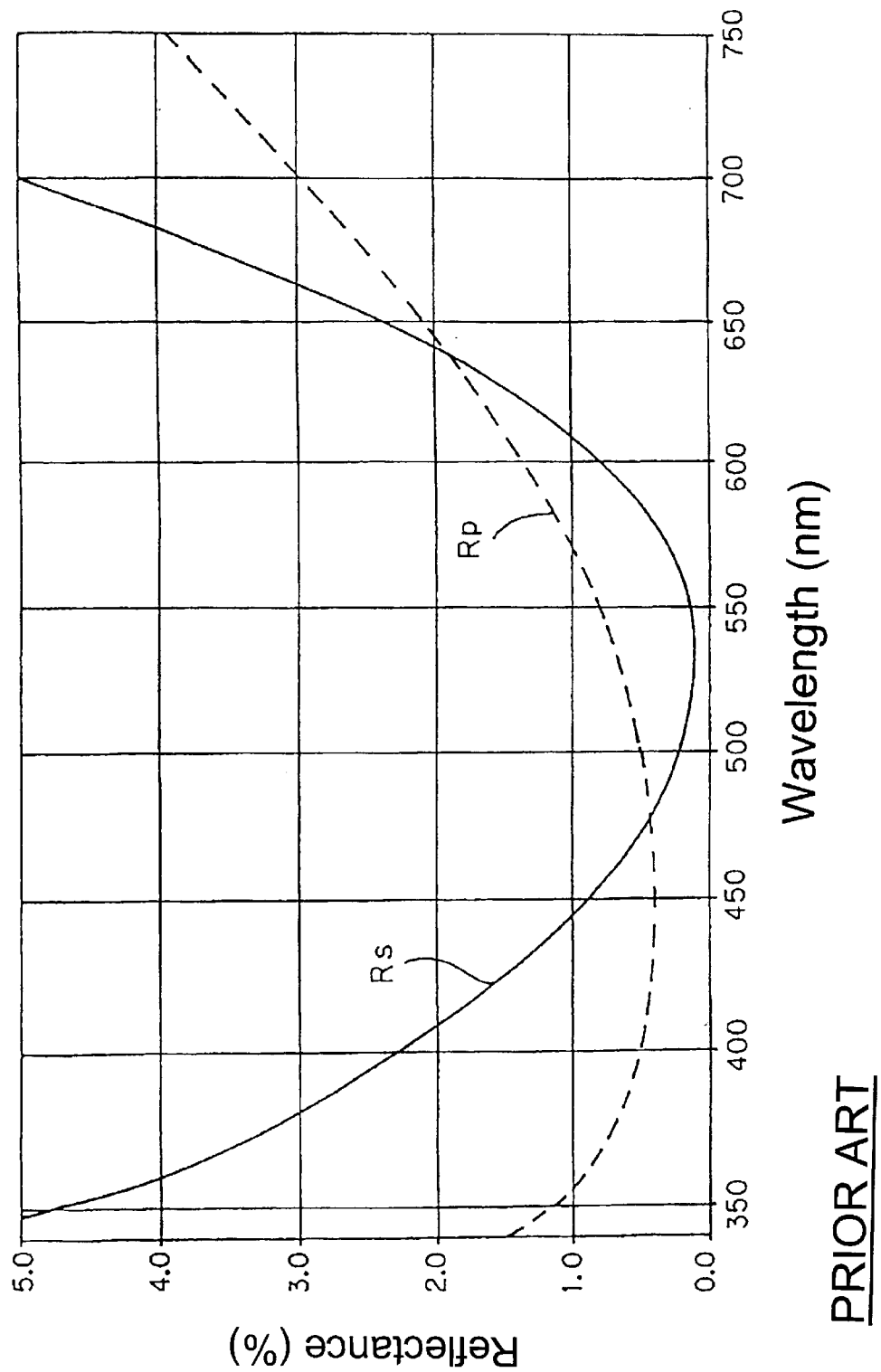
FIG. 40 shows the reflectance of the antireflection coating according to the fourth prior art.

FIG. 31 shows the structure of an antireflection coating according to a sixteenth embodiment. The design dominant wavelength $\lambda_0$ is 550 nm. In this embodiment, compared to the eighth embodiment, the thicknesses d are changed and the material of the substrate is changed (refractive index ns=1.76). A computer-simulated reflectance characteristic of the antireflection coating of this structure at an incident angle of 45 degrees is as shown in FIG. 32. According to FIG. 32, like the eighth embodiment, in the neighborhood of the design dominant wavelength $\lambda_0$ (550 nm), the reflectance Rs of the light of the s-polarized component is lower than the reflectance Rp of the light of the p-polarized component, and the reflectance Rs of the light of the s-polarized component is low.

In any of the ninth to the sixteenth embodiments, when the incident angle is 45 degrees, in the neighborhood of the design dominant wavelength $\lambda_0$ (550 nm), although the reflectance Rp of the light of the p-polarized component is high, the reflectance Rs of the light of the s-polarized component is low. Consequently, similar effects as those of the eighth embodiment are obtained.

As described above, in any of the antireflection coatings of the eighth to the sixteenth embodiments, the reflectance Rs of the light of the s-polarized component can be reduced, and according to computer simulations, when the refractive indices n and the thicknesses d of the first, the second, the third, the fourth and the fifth layers are n1, n2, n3, n4 and n5, and d1, d2, d3, d4 and d5, by n2 or n3 being not more than 1.56 and by satisfying the following expressions (1) to (7):

$$n4 \geq n2 > n1 \geq n5 \quad (1)$$

$$n2 > n3 \quad (2)$$

$$0 < (n1*d1) \leq 0.06*\lambda_0 \quad (3)$$

$$0.03*\lambda_0 \leq (n2*d2) \leq 0.15*\lambda_0 \quad (4)$$

$$0.02*\lambda_0 \leq (n3*d3) \leq 0.19*\lambda_0 \quad (5)$$

$$0.09*\lambda_0 \leq (n4*d4) \leq 1.30*\lambda_0 \quad (6)$$

$$0.24*\lambda_0 \leq (n5*d5) \leq 0.36*\lambda_0 \quad (7)$$

the reflectance of the light of the s-polarized component can be reduced in the small-incident-angle range to the large-incident-angle range in the neighborhood of 45 degrees.

When the expression (3) is replaced by the following expression (3'):

$$0.20 \leq (n1*d1) \leq 1.25*\lambda_0 \quad (3')$$

the reflectance of the light of the s-polarized component can also be reduced in the small-incident-angle range to the large-incident-angle range in the neighborhood of 45 degrees.

Further, when the refractive index of the substrate is ns, by satisfying the following expressions (8) to (13) as well as the expressions (1) to (7), or (1), (2) (3') to (7):

$$1.50 \leq ns \leq 1.85 \quad (8)$$

$$1.35 \leq n1 \leq 1.80 \quad (9)$$

$$2.00 \leq n2 \leq 2.60 \quad (10)$$

$$1.35 \leq n3 \leq 1.80 \quad (11)$$

$$2.00 \leq n4 \leq 2.60 \quad (12)$$

$$1.38 \leq n5 \leq 1.48 \quad (13)$$

the reflectance of the light of the s-polarized component can further be reduced in the small-incident-angle range to the large-incident-angle range in the neighborhood of 45 degrees.

As materials having the above-mentioned refractive indices, the following can be used: for the first layer, MgF$_2$, Na$_5$Al$_3$F$_{14}$, SiO$_2$, Al$_2$O$_3$, MgO and the like; for the second layer, TiO$_2$, Zn$_2$ (zinc sulfide), ZrTiO$_4$, Ta$_2$O$_5$ (tantalum oxide) and the like; for the third layer, MgF$_2$, Na$_5$Al$_3$F$_{14}$, SiO$_2$, Al$_2$O$_3$, MgO and the like; for the fourth layer, TiO$_2$, ZnS, ZrTiO$_4$, Ta$_2$O$_5$ and the like; and for the fifth layer, MgF$_2$, Na$_5$Al$_3$F$_{14}$, SiO$_2$ and the like. A thin film made of one or a plurality of these materials may be formed in each layer, or a thin film whose main component is one or a plurality of these materials may be formed in each layer.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

That which is claimed is:

1. An antireflection coating for a substrate comprising:
   a first layer for placement on said substrate either directly or through another layer, said first layer having a thickness d1 and a refractive index n1;
   a second layer in contact with said first layer, said second layer having a thickness d2 and a refractive index n2;
   a third layer in contact with said second layer, said third layer having a thickness d3 and a refractive index n3; and
   a fourth layer in contact with said third layer, said fourth layer having a thickness d4 and a refractive index n4;
   wherein, for a dominant wavelength $\lambda_0$, the following relationships are satisfied:
   n3>n2>n1>n4;
   $0<(n1*d1)\leq 0.75*\lambda_0$;
   $0.20*\lambda_0\leq(n2*d2)\leq 0.43*\lambda_0$;
   $0.07*\lambda_0\leq(n3*d3)\leq 1.10*\lambda_0$; and
   $0.28*\lambda_0\leq(n4*d4)\leq 0.35*\lambda_0$.

2. An antireflection coating in accordance with claim 1, wherein, for a substrate having a refractive index ns, each of the following conditions is satisfied:
   $1.50\leq ns\leq 1.85$;
   $1.35\leq n1\leq 1.48$;
   $1.47\leq n2\leq 1.80$;
   $2.30\leq n3\leq 2.60$; and
   $1.35\leq n4\leq 1.48$.

3. An antireflection coating in accordance with claim 2, wherein said first layer comprises $MgF_2$.

4. An antireflection coating in accordance with claim 1, wherein said first layer comprises $SiO_2$; and
   wherein the following condition is satisfied:
   $0.15*\lambda_0\leq(n1*d1)\leq 0.75*\lambda_0$.

5. An antireflection coating in accordance with claim 1, wherein:
   said first layer comprises at least one of $MgF_2$, $Na_5Al_3F_{14}$, and $SiO_2$;
   said second layer comprises at least one of $SiO_2$, $YF_3$, $Al_2O_3$, $Y_2O_3$, and $MgO$;
   said third layer comprises at least one of $TiO_2$, and $ZnS$; and
   said fourth layer comprises at least one of $MgF_2$, $Na_5Al_3F_{14}$, and $SiO_2$.

6. An antireflection coating in accordance with claim 1, wherein:
   adjacent layers of said first, second, third and fourth layers are comprised of different materials; and
   wherein said first, second, third and fourth layers are configured so that, when said coating is in contact with said substrate, for light incident on said coating, from a side opposing said substrate, at an angle of incidence of approximately 45 degrees, an amount of s-polarized light reflected therefrom, as a percentage of an amount of s-polarized light incident thereon, is lower than an amount of p-polarized light reflected therefrom, as a percentage of an amount of p-polarized light incident thereon.

7. An antireflection coating for a substrate comprising:
   a first layer for placement on said substrate either directly or through another layer, said first layer having a thickness d1 and a refractive index n1;
   a second layer in contact with said first layer, said second layer having a thickness d2 and a refractive index n2;
   a third layer in contact with said second layer, said third layer having a thickness d3 and a refractive index n3;
   a fourth layer in contact with said third layer, said fourth layer having a thickness d4 and a refractive index n4; and
   a fifth layer in contact with said fourth layer, said fifth layer having a thickness d5 and a refractive index n5
   wherein, for a dominant wavelength $\lambda_0$, the following relationships are satisfied:
   n2 or $n3\leq 1.56$;
   $n4\geq n2>n1\geq n5$;
   n2>n3;
   $0<(n1*d1)\leq 0.06*\lambda_0$;
   $0.03*\lambda_0\leq(n2*d2)\leq 0.15*\lambda_0$;
   $0.02*\lambda_0\leq(n3*d3)\leq 0.19*\lambda_0$;
   $0.09*\lambda_0\leq(n4*d4)\leq 1.30*\lambda_0$; and
   $0.24*\lambda_0\leq(n5*d5)\leq 0.36*\lambda_0$.

8. An antireflection coating in accordance with claim 7, wherein, for a substrate having a refractive index ns, each of the following conditions is satisfied:
   $1.50\leq ns\leq 1.85$;
   $1.35\leq n1\leq 1.80$;
   $2.00\leq n2\leq 2.60$;
   $1.35\leq n3\leq 1.80$;
   $2.00\leq n4\leq 2.60$; and
   $1.38\leq n5\leq 1.48$.

9. An antireflection coating for a substrate comprising:
   a first layer for placement on said substrate either directly or through another layer, said first layer having a thickness d1 and a refractive index n1;
   a second layer in contact with said first layer, said second layer having a thickness d2 and a refractive index n2;
   a third layer in contact with said second layer, said third layer having a thickness d3 and a refractive index n3;
   a fourth layer in contact with said third layer, said fourth layer having a thickness d4 and a refractive index n4;
   a fifth layer in contact with said fourth layer, said fifth layer having a thickness d5 and a refractive index n5
   wherein, for a dominant wavelength $\lambda_0$, the following relationships are satisfied;
   n2 or $n3\leq 1.56$;
   $n4\geq n2>n1\geq n5$;
   n2>n3;
   $1.50\leq ns\leq 1.85$;
   $1.35\leq n1\leq 1.80$;
   $2.00\leq n2\leq 2.60$;
   $1.35\leq n3\leq 1.80$;
   $2.00\leq n4\leq 2.60$; and
   $1.38\leq n5\leq 1.48$
   $0.20\leq(n1*d1)\leq 1.25*\lambda_0$;
   $0.03*\lambda_0\leq(n2*d2)\leq 1.15*\lambda_0$;
   $0.02*\lambda_0\leq(n3*d3)\leq 1.19*\lambda_0$;
   $0.09*\lambda_0\leq(n4*d4)\leq 1.30*\lambda_0$; and
   $0.24*\lambda_0\leq(n5*d5)\leq 0.36*\lambda_0$.

10. An antireflection coating in accordance with claim 7, wherein:

said first layer comprises at least one of $MgF_2$, $Na_5Al_3F_{14}$, $SiO_2$, $Al_2O_3$, and $MgO$;

said second layer comprises at least one of $TiO_2$, $Zn_2$, $ZrTiO_4$, and $Ta_2O_5$;

said third layer comprises at least one of $MgF_2$, $SiO_2$, $Al_2O_3$, and $MgO$;

said fourth layer comprises at least one of $TiO_2$, ZnS, $ZrTiO_4$, and $Ta_2O_5$; and said fifth layer comprises at least one of $MgF_2$, and $SiO_2$.

11. An antireflection coating in accordance with claim 7, wherein:

adjacent layers of said first, second, third, fourth and fifth layers are comprised of different materials; and wherein said first, second, third, fourth and fifth layers are configured so that, when said coating is in contact with said substrate, for light incident on said coating, from a side opposing said substrate, at an angle of incidence of approximately 45 degrees, an amount of s-polarized light reflected therefrom, as a percentage of an amount of s-polarized light incident thereon, is lower than an amount of p-polarized light reflected therefrom, as a percentage of an amount of p-polarized light incident thereon.

12. An antireflection coating for a substrate comprising:

a laminate of at least four layers, a first of said four layers for contact with said substrate either directly or through another layer, adjacent layers of said at least four layers being comprised of different materials;

wherein said at least four layers are configured so that, when said laminate is in contact with said substrate, either directly or through another layer, for light incident on said laminate, from a side opposing said substrate, at an angle of incidence of approximately 45 degrees, an amount of s-polarized light reflected therefrom, as a percentage of an amount of s-polarized light incident thereon, is lower than an amount of p-polarized light reflected therefrom, as a percentage of an amount of p-polarized light incident thereon.

13. A process for forming an anti-reflection coating on an article, comprising the steps of:

disposing an anti-reflection coating including a plurality of layers on said article, said disposing step including the steps of:

forming a first layer on said article either directly or through another layer;

forming a second layer on said first layer;

forming a third layer on said second layer; and forming a fourth layer on said third layer, adjacent layers of said first, second, third and fourth layers being composed of different materials;

wherein said plurality of layers are configured so that, for light incident on said anti-reflection coating, from a side op-posing said article, at an angle of incidence of approximately 45 degrees, an amount of s-polarized light reflected therefrom, as a percentage of an amount of s-polarized light incident thereon, is lower than an amount of p-polarized light reflected therefrom, as a percentage of an amount of p-polarized light incident thereon.

14. An article comprising:

a substrate;

a first layer arranged on said substrate either directly or through another layer, said first layer having a thickness d1 and a refractive index n1;

a second layer arranged on said first layer, said second layer having a thickness d2 and a refractive index n2;

a third layer arranged on said second layer, said third layer having a thickness d3 and a refractive index n3; and a fourth layer arranged on said third layer, said fourth layer having a thickness d4 and a refractive index n4;

wherein, for a dominant wavelength $\lambda_0$, the following relationships are satisfied:

$n3>n2>n1 \geq n4$;

$0<(n1*d1) \leq 0.75*\lambda_0$;

$0.20*\lambda_0 \leq (n2*d2) \leq 0.43*\lambda_0$;

$0.07*\lambda_0 \leq (n3*d3) \leq 1.10*\lambda_0$; and $0.28*\lambda_0 \leq (n4*d4) \leq 0.35*\lambda_0$.

* * * * *

UNITED STATES PATENT AND TRADEMARK OFFICE
CERTIFICATE OF CORRECTION

PATENT NO. : 6,280,848 B1
DATED : August 28, 2001
INVENTOR(S) : Masaru Okumura et al.

It is certified that error appears in the above-identified patent and that said Letters Patent is hereby corrected as shown below:

Column 11,
Line 23, delete "n3>n2>n1>n4", and insert -- n3>n2>n1≥n4 --.

Column 12,
Line 45, after "n4;", insert -- and --.

Column 14,
Line 14, delete "op-posing", and insert -- opposing --.

Signed and Sealed this

Seventh Day of May, 2002

Attest:

JAMES E. ROGAN
Attesting Officer
Director of the United States Patent and Trademark Office